United States Patent [19]

Kosaka et al.

[11] Patent Number: 5,355,092
[45] Date of Patent: Oct. 11, 1994

[54] RELATIVELY SIMPLE QPSK DEMODULATOR, THAT USES SUBSTANTIALLY ALL DIGITAL CIRCUITRY AND AN INTERNALLY GENERATED SYMBOL CLOCK, AND CIRCUITRY FOR USE THEREIN

[75] Inventors: Akio Kosaka; Toshinori Iinuma; Masahiro Narita, all of Gifu, Japan

[73] Assignees: Sanyo Electric Co., Ltd., Osaka; Tottori Sanyo Electric Co., Ltd., Tottori, both of Japan

[21] Appl. No.: 83,546

[22] Filed: Jun. 24, 1993

[30] Foreign Application Priority Data

| Jun. 26, 1992 | [JP] | Japan | 4-169200 |
| Jul. 8, 1992 | [JP] | Japan | 4-181055 |
| Jul. 23, 1992 | [JP] | Japan | 4-197133 |
| Feb. 3, 1993 | [JP] | Japan | 5-016391 |

[51] Int. Cl.$^5$ .......................... H03D 3/00; H03D 3/18
[52] U.S. Cl. ....................... 329/304; 375/82; 375/83
[58] Field of Search ............... 329/304, 306, 307; 375/80, 81, 82, 83, 84, 85, 86, 87

[56] References Cited

U.S. PATENT DOCUMENTS 5,097,220  3/1992  Shimakata ................. 329/306

FOREIGN PATENT DOCUMENTS 3188737  8/1991  Japan .

*Primary Examiner*—David Mis
*Attorney, Agent, or Firm*—Peter L. Michaelson

[57] ABSTRACT

Apparatus for demodulating an incoming digitally phase modulated analog signal to reproduce symbol data carried by the signal. Specifically, the demodulator relies on first counting, on a free-running and modulo basis, pulses of a fixed-frequency reference clock signal to form a counted value. The incoming signal is converted to a one-bit phase modulated digital signal. At the occurrence of a pre-defined point in the one-bit phase modulated signal, typically a rising edge occurring at the symbol rate, the counted value is stored as phase information. Within each symbol period, a difference between current and immediately prior counted values, i.e. the latter being a current value but delayed by one symbol period, is determined. This difference, i.e. phase change data, is subsequently sampled and decoded to yield reproduced symbol data, as well as, used, through a phase locked loop, to generate a data clock and the symbol clock.

27 Claims, 26 Drawing Sheets

FIG. 5    PRIOR ART

BINARY VALUE DATA TIME SERIES    $\cdots a_{n-1}, a_n, a_{n+1}, a_{n+2} \cdots$

SYMBOL TIME SERIES               $\cdots \quad (a_n, a_{n+1}) \quad \cdots$

QUATERNARY VALUE SYMBOL DATA     $\cdots \quad (X_k, Y_k) \quad \cdots$

FIG. 6    PRIOR ART

| $X_k$ | $Y_k$ | $\Delta \Phi_k$ |
|-------|-------|-----------------|
| 0 | 1 | $3\pi/4$ |
| 0 | 0 | $\pi/4$ |
| 1 | 0 | $-\pi/4$ |
| 1 | 1 | $-3\pi/4$ |

FIG. 17

| AMOUNT OF PHASE CHANGE OF ONE SYMBOL TIME ($\Delta\Phi+\Delta\omega_C$) | PHASE CHANGE DATA (DECIMAL REPRESENTATION) | PHASE CHANGE DATA (BINARY REPRESENTATION) $D_4\ D_3\ D_2\ D_1\ D_0$ | PHASE ERROR DATA (DECIMAL REPRESENTATION) | PHASE ERROR DATA (BINARY REPRESENTATION) |
|---|---|---|---|---|
| $3\pi/4+4\pi/16$ | 16 | 10000 | 0 | 000 |
| $3\pi/4+3\pi/16$ | 17 | 10001 | 1 | 001 |
| $3\pi/4+2\pi/16$ | 18 | 10010 | 2 | 010 |
| $3\pi/4+1\pi/16$ | 19 | 10011 | 3 | 011 |
| $3\pi/4$ | 20 | 10100 | 4 | 100 |
| $3\pi/4-1\pi/16$ | 21 | 10101 | 5 | 101 |
| $3\pi/4-2\pi/16$ | 22 | 10110 | 6 | 110 |
| $3\pi/4-3\pi/16$ | 23 | 10111 | 7 | 111 |
| $\pi/4+4\pi/16$ | 24 | 11000 | 0 | 000 |
| $\pi/4+3\pi/16$ | 25 | 11001 | 1 | 001 |
| $\pi/4+2\pi/16$ | 26 | 11010 | 2 | 010 |
| $\pi/4+1\pi/16$ | 27 | 11011 | 3 | 011 |
| $\pi/4$ | 28 | 11100 | 4 | 100 |
| $\pi/4-1\pi/16$ | 29 | 11101 | 5 | 101 |
| $\pi/4-2\pi/16$ | 30 | 11110 | 6 | 110 |
| $\pi/4-3\pi/16$ | 31 | 11111 | 7 | 111 |
| $-\pi/4+4\pi/16$ | 0 | 00000 | 0 | 000 |
| $-\pi/4+3\pi/16$ | 1 | 00001 | 1 | 001 |
| $-\pi/4+2\pi/16$ | 2 | 00010 | 2 | 010 |
| $-\pi/4+1\pi/16$ | 3 | 00011 | 3 | 011 |
| $-\pi/4$ | 4 | 00100 | 4 | 100 |
| $-\pi/4-1\pi/16$ | 5 | 00101 | 5 | 101 |
| $-\pi/4-2\pi/16$ | 6 | 00110 | 6 | 110 |
| $-\pi/4-3\pi/16$ | 7 | 00111 | 7 | 111 |
| $-3\pi/4+4\pi/16$ | 8 | 01000 | 0 | 000 |
| $-3\pi/4+3\pi/16$ | 9 | 01001 | 1 | 001 |
| $-3\pi/4+2\pi/16$ | 10 | 01010 | 2 | 010 |
| $-3\pi/4+1\pi/16$ | 11 | 01011 | 3 | 011 |
| $-3\pi/4$ | 12 | 01100 | 4 | 100 |
| $-3\pi/4-1\pi/16$ | 13 | 01101 | 5 | 101 |
| $-3\pi/4-2\pi/16$ | 14 | 01110 | 6 | 110 |
| $-3\pi/4-3\pi/16$ | 15 | 01111 | 7 | 111 |

FIG. 19

| PHASE ERROR $\Delta \omega_c T$ | FREQUENCY OFFSET $\Delta f_c$ [Hz] |
|---|---|
| $4\pi/16$ | 2625 |
| $3\pi/16$ | 1968.75 |
| $2\pi/16$ | 1312.5 |
| $\pi/16$ | 656.25 |
| 0 | 0 |
| $-\pi/16$ | $-656.25$ |
| $-2\pi/16$ | $-1312.5$ |
| $-3\pi/16$ | $-1968.75$ |

(A) SYMBOL CLOCK (B) DATA CLOCK

| $\Delta \Phi k$ | $D_4$ | $D_3$ | RXk | RYk |
|---|---|---|---|---|
| $3\pi/4$ | 1 | 0 | 0 | 1 |
| $\pi/4$ | 1 | 1 | 0 | 0 |
| $-\pi/4$ | 0 | 0 | 1 | 0 |
| $-3\pi/4$ | 0 | 1 | 1 | 1 |

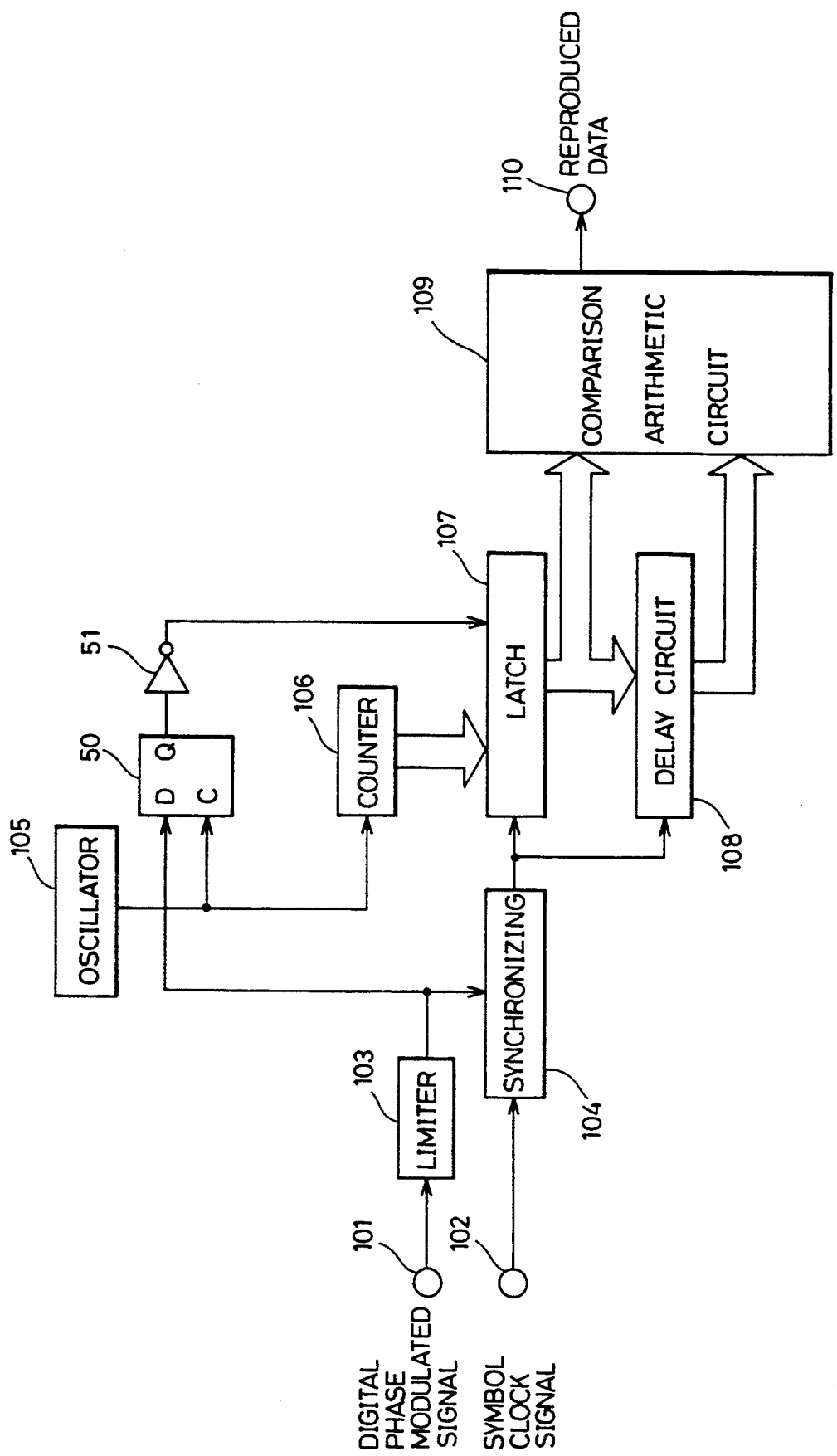

RELATIVELY SIMPLE QPSK DEMODULATOR, THAT USES SUBSTANTIALLY ALL DIGITAL CIRCUITRY AND AN INTERNALLY GENERATED SYMBOL CLOCK, AND CIRCUITRY FOR USE THEREIN

BACKGROUND OF THE INVENTION

1. Field of the Invention

The present invention relates generally to digital demodulators, and more particularly, to a digital demodulator used as a MODEM for digital communication equipment such as a land mobile radio telephone, a portable radio telephone and a cordless telephone.

2. Description of the Background Art

A conventional digital communication apparatus modulates a carrier signal in response to a digital information signal (baseband signal) on the transmitting side, and demodulates the modulated signal on the receiving side to extract the information signal in order to achieve efficient transmission.

Such modulation systems include: an amplitude shift keying (ASK) system in which an amplitude of a carrier is changed in response to a digital baseband signal, a frequency shift keying (FSK) system in which a frequency of a carrier is deviated in response to a baseband signal, a phase shift keying (PSK) system in which a phase of a carrier is changed in response to a baseband signal, and a quadrature amplitude modulating (QAM) system in which an amplitude and a phase of a carrier are individually changed in response to a baseband signal.

The carrier signal (hereinafter referred to as "modulated signal") $S(t)$ thus modulated in response to a baseband signal can be generally expressed by the following equation.

$$\begin{aligned} S(t) &= A(t)\cos\{\omega_c \cdot t + \Phi(t)\} \\ &= A(t)\cos\Phi(t) \cdot \cos\omega_c \cdot t \\ &\quad - A(t)\sin\Phi(t) \cdot \sin\omega_c \cdot t \\ &= i(t)\cos\omega_c \cdot t - q(t)\sin\omega_c \cdot t \end{aligned} \quad (1)$$

In the above equation, $A(t)$ denotes an amplitude, $\omega_c$ denotes a carrier frequency, and $\Phi(t)$ denotes a phase of a baseband signal.

As is clear from the above-described equation (1), the modulated signal can be represented by two components orthogonal to each other, that is, by a sum of an in-phase (I phase) component (the first term of the above-described equation (1)) and a quadrature phase (Q phase) component (the second term of the above-described equation (1)). Such a modulated signal can be therefore formed by using a quadrature modulator.

FIGS. 1 and 2 are a block diagram and a spatial diagram conceptually showing the principle of such a quadrature modulator, respectively. It should be noted that the following shows a phase modulating system for changing a phase of a carrier in response to a baseband signal, in which an amplitude $A(t)$ is fixed to "1".

Referring to FIG. 1, a mapping circuit 2 provides I phase and Q phase components of a modulating wave signal as rectangular wave signals in response to a digital baseband signal applied through an input terminal 1. The I phase component is applied to one input of a multiplier 7 through a low pass filter (LPF) 3, while the Q phase component is applied to one input of a multiplier 8 through an LPF 4.

A carrier signal $\cos \omega_c \cdot t$ is applied from a signal source 5 to the other input of multiplier 7, which provides an I phase component $\cos \Phi(t)\cdot\cos \omega_c \cdot t$ of a modulated signal. A signal $-\sin \omega_c \cdot t$, obtained by shifting the phase of the carrier signal from signal source 5 by $\pi/2$ by means of a phase shift circuit 6, is applied to the other input of multiplier 8, which itself provides a Q phase component $-\sin \Phi(t)\cdot\sin \omega_c \cdot t$ of the modulated signal. The resulting I phase and Q phase components can be represented in a one-to-one correspondence on the I and Q coordinates as shown in FIG. 2.

These I phase and Q phase components are added to each other by an adder 9 to become such a modulated signal as expressed by equation (1). The modulated signal is provided from an output terminal 10. Multipliers 7 and 8 and adder 9 form a quadrature modulating unit.

There is a case where an M-phase PSK (Phase Shift Keying) signal is generated by using such a quadrature modulator. FIG. 3 is a diagram conceptually showing the principle of generation of a $\pi/4$ shift QPSK (Quadri Phase Shift Keying) signal, which is one example of such an M-phase PSK signal.

Referring to FIG. 3, it is assumed that a signal point corresponding to I phase component and Q phase component data of a baseband signal at a certain time point exists at one of the points a, c, e and g on a unit circle having a radius of 1 as shown in FIG. 3. At a subsequent time point after a lapse of a predetermined time slot, the signal point shifts to one of the intersections b, d, f and h then situated between two virtual axes obtained by rotating the I axis and the Q axis by $\pi/4$ along the unit circle of a radius of 1. The I axis and the Q axis will be rotated by $\pi/4$ for each predetermined time slot in the same manner as described above, whereby the signal point sequentially shifts on the unit circle.

For example, if it is assumed that the signal point exists at the point a at a predetermined time point in FIG. 3 and the baseband signal does not change, the signal point shifts as a point→b point→c point→d point→e point→f point→g point→h point for every predetermined time slot, that is, at every $\pi/4$ rotation of the I axis and the Q axis. In this case, the I and Q phase data each takes the five types of values of "1", "$1/\sqrt{2}$", "0", "$-1/\sqrt{2}$" and "$-1$" as can be seen from FIG. 3.

According to the digital cellular telecommunication system standard (RCR STD-27) of Japan and the cellular telecommunication standard (TIA-IS-54) of the North America, differential encoding is carried out in $\pi/4$ shift QPSK modulation. Because of such differential encoding, it is only necessary to consider a relative phase between continuous symbols. Therefore, by shifting the phase of the signal spatial diagram of FIG. 3 by $\pi/8$ as shown in FIG. 4, the I phase data and the Q phase data each has a level of a quadri value. Such $\pi/4$ shift DQPSK modulation by such differential encoding is generally referred to as "$\pi/4$ shift DQPSK modulation".

Description will now be given for a $\pi/4$ shift QPSK modulating system using such differential encoding. A digital baseband signal is serially applied to mapping circuit 2 (FIG. 1), with every two bits from the leading bit being converted (binary value/quarternary value converted) into parallel 2-bit symbol data $(X_k, Y_k)$. FIG. 5 is a diagram schematically showing the manner of such binary value/quaternary value conversion.

Thus obtained 2-bit symbol data ($X_k$, $Y_k$) is further converted into a quadrature signal ($I_k$, $Q_k$) by differential encoding in mapping circuit 2. Conversion from the symbol data ($X_k$, $Y_k$) into the quadrature signal ($I_k$, $Q_k$) is carried out according to the following equation (2).

$$I_k = I_{k-1} \cdot \cos\{\Delta\Phi(X_k, Y_k)\} - Q_{k-1} \cdot \sin\{\Delta\Phi(X_k, Y_k)\} \quad Q_k = I_{k-1} \cdot \sin\{\Delta\Phi(X_k, Y_k)\} + Q_{k-1} \cdot \cos\{\Delta\Phi(X_k, Y_k)\} \quad (2)$$

In the above-described equation (2), $\Delta\Phi(X_k, Y_k) = \Delta\Phi_k$ is defined based on differential coding rules shown in a table of FIG. 6. The quadrature signals $I_k$, $Q_k$ thus obtained by mapping circuit 2 independently have their bandwidths limited by LPFs 3 and 4 (FIG. 1) and are thereafter applied to the quadrature modulating unit as the I phase component i(t) and the Q phase component q(t).

When T denotes a symbol period, and $\Phi(t) = \Phi_k$ denotes a phase at $t = kT$, $\Phi_k$ is expressed as in the following.

$$\Phi_k = \tan^{-1}(Q_k/I_k) \quad (3)$$

When a phase at an immediately preceding symbol, that is, at $t = kT - T$, is $\Phi(t) = \Phi_{k-1}$, $\Phi_{k-1}$ is expressed as in the following.

$$\Phi_{k-1} = \tan^{-1}(Q_{k-1}/I_{k-1}) \quad (4)$$

From the above-described equations (2), (3) and (4), the relation between $\Phi_k$ and $\Phi_{k-1}$ can be defined as follows.

$$\Phi_k = \tan^{-1} \frac{I_{k-1}\sin\{\Delta\Phi(X_k, Y_k)\} + Q_{k-1}\cos\{\Delta\Phi(X_k, Y_k)\}}{I_{k-1}\cos\{\Delta\Phi(X_k, Y_k)\} + Q_{k-1}\sin\{\Delta\Phi(X_k, Y_k)\}} \quad (5)$$

$$= \tan^{-1} \frac{\tan\{\Delta\Phi(X_k, Y_k)\} + \tan\Phi_{k-1}}{1 - \tan\Phi_{k-1} \cdot \tan\{\Delta\Phi(X_k, Y_k)\}}$$

$$= \tan^{-1} \tan\{\Phi_{k-1} + \Delta\Phi(X_k, Y_k)\}$$

$$= \Phi_{k-1} + \Delta\Phi(X_k, Y_k)$$

From the above-described equation (5), the following relation can be obtained.

$$\Delta\Phi(X_k, Y_k) = \Phi_k - \Phi_{k-1} \quad (6)$$

Therefore, in order to demodulate the $\pi/4$ shift QPSK modulated signal, according to the above-described equation (6), at each maximum effect point, the phase $\Phi_k$ at the symbol and the phase $\Phi_{k-1}$ at an immediately preceding symbol are detected. Then, by subtracting the phase $\Phi_{k-1}$ from the phase $\Phi_k$, a phase change $\Delta\Phi(X_k, Y_k)$ in one symbol section is found. Based on the table of FIG. 6, a corresponding $X_k$, $Y_k$ can be obtained from the phase difference $\Delta\Phi(X_k, Y_k)$. In a manner opposite to the manner shown in FIG. 5, serial data of ..., $a_{n-1}$, $a_n$, $a_{n+1}$, $a_{n+2}$, ... can be reproduced (demodulated) from $X_k$, $Y_k$. A digital demodulator for demodulating a digital phase modulated signal is disclosed in, for example, Japanese Patent Laying-Open No. 3-188737. FIG. 7 is a block diagram schematically showing a configuration of such a conventional digital demodulator.

Referring to FIG. 7, the digital demodulator includes an input terminal 101 to which a received digital phase modulated signal is applied, an input terminal 102 to which a symbol clock signal is applied, a limiter 103 generating a constant amplitude version of the digital phase modulated signal applied to input terminal 101, a synchronizing circuit 104 for sampling the symbol clock signal in response to an output signal of limiter 103, an oscillator 105 which generates a frequency at an integer multiple of a frequency of a carrier signal, a counter 106 for performing a counting operation in response to an output of oscillator 105, a latch circuit 107 for latching an output of counter 106 in response to an output of synchronizing circuit 104, a delay circuit 108 for delaying an output of latch circuit 107 for one symbol period (also referred to hereinafter as "section") in response to the output of synchronizing circuit 104, a comparison arithmetic circuit 109 for comparing the output of latch circuit 107 with an output of delay circuit 108 and thereby detecting a phase change in one symbol period so as to reproduce data therefrom, and a data output terminal 110 for providing data reproduced by comparison arithmetic circuit 109.

Operation of the digital demodulator shown in FIG. 7 will now be described. The amplitude of the digital phase modulated signal applied to input terminal 101 is limited by limiter 103 into rectangular wave signal with appropriate logic levels. On the other hand, the symbol clock signal which is a rectangular wave signal defined so that the times of its rising edges corresponds to times at which data is to be sampled, that is, the maximum effect point. The symbol clock signal is supplied to input terminal 102 from a symbol clock signal source, not shown. Synchronizing circuit 104 samples the symbol clock signal applied through input terminal 102 in response to each rising edge of the output signal produced by limiter 103. Therefore, a rising edge of the sampled symbol clock signal, that is, the output signal of synchronizing circuit 104, matches a zero-crossing point of the applied digital phase modulated signal.

On the other hand, oscillator 105 is structured so as to supply a clock signal of a frequency that is n times (where n is a positive integer) a frequency of the input digital phase modulated signal. Counter 106 1/n frequency-divides the clock signal to provide a count value of n division of a phase of one period of a carrier. The count value of counter 106 is held by latch circuit 107 at an occurrence of each rising edge of the output of synchronizing circuit 104 to be phase-quantized. The held count value represents the phase $\Phi_k$ of the digital phase modulated signal of the above-described equation (3).

The output of latch circuit 107 is applied to delay circuit 108 to be held therein until the next occurrence of a rising edge produced at the output of synchronizing circuit 104. The delayed value represents the phase $\Phi_{k-1}$ at an immediately preceding symbol of the digital phase modulated signal of the above-described equation (4).

The output $\Phi_k$ of latch circuit 107 and the output $\Phi_{k-1}$ of delay circuit 108 are applied to comparison arithmetic circuit 109. Comparison arithmetic circuit 109 detects the change $\Delta\Phi(X_k, Y_k)$ of the phase in one symbol section. Comparison arithmetic circuit 109 further reproduces the 2-bit symbol data $X_k$, $Y_k$ from the phase change $\Delta\Phi_k$ based on the differential coding rules shown in the table of FIG. 6 to convert the same into serial data, and supplies the resulting serial data as demodulated data. The demodulated data is supplied through output terminal 110.

As described above, since an oscillation frequency of oscillator 105 is set to n times that of a carrier frequency of the digital phase modulated signal, phase quantization is carried out such that a resolution of a phase becomes $2\pi/n$ in demodulating. Therefore, if n is set to be sufficiently large, it is possible to obtain a sufficiently small resolution in phase.

As long as the oscillation frequency of oscillator 105 is accurately set to an integer n multiple of the carrier frequency of the digital phase modulated signal as described above, it is possible to obtain accurate phase change data $\Delta\Phi_k$. In the conventional digital demodulator as shown in FIG. 7, it is required to generate a symbol clock signal and to supply input terminal 102 with the same, separately from the input digital phase modulated signal. In the case of the above-described $\pi/4$ shift QPSK modulated signal, since an envelope of the modulated signal includes a frequency component of the symbol clock signal, a complicated analog circuit for extracting the frequency component is required in order to obtain the symbol clock signal. Therefore, it was impossible to constitute the entire conventional digital demodulator completely with digital circuits, thereby rendering a task of making a digital demodulator that is small in size and light in weight, through LSI implementation difficult.

Furthermore, in a mobile communication system such as a land mobile radio telephone and a portable radio telephone, individual oscillators are used on the transmitting side and the receiving side. Therefore, it is practically impossible to accurately set an oscillation frequency of oscillator 105 of a digital demodulator on the receiving side to exactly n times a carrier frequency of a digital phase modulated signal received from the transmitting side. When there exists a frequency offset between the carrier frequency on the transmitting side and the oscillation frequency of the receiving side as described above, a phase error component corresponding to the amount of the frequency offset is generated in the phase change data $\Delta\Phi_k$ evaluated by comparison arithmetic circuit 109, which hampers accurate demodulation. Furthermore, such a phase error component is caused not only by the frequency offset between the transmitting side and the receiving side as described above, but also by a shift of the carrier frequency caused by Doppler phasing in mobile communication.

In the above-described conventional digital demodulator, there is a case where counter 106 is in an unstable state at an occurrence of a rising edge of the output signal produced by synchronizing circuit 104. If latch circuit 107 carries out latch operation in response to the output of synchronizing circuit 104 in such a state, it is not possible to carry out accurate phase quantization, which in turn makes it impossible to obtain accurate demodulated data.

In addition, in the conventional digital demodulator, in order to obtain a necessary small resolution in phase as described above, the oscillation frequency of oscillator 105 must be set to be sufficiently high (that is, n must be set to be sufficiently large) compared to the carrier frequency of the digital phase modulated signal. In general, in a CMOS digital circuit, it is known that the higher the frequency of an operating clock, the larger the power consumption. Therefore, in the conventional digital demodulator, when the frequency of the operating clock is increased in order to enhance phase resolution, power consumption increases. Especially in a communication terminal such as a battery-driven portable radio telephone, such increased power consumption causes various problems such as a shortened waiting time.

SUMMARY OF THE INVENTION

One object of the present invention is to provide a digital demodulator which, constituted wholely with digital circuits, can be made small in size and light in weight by implementation as an LSI circuit.

Another object of the present invention is to provide a digital demodulator which can remove a phase error component, which is generated in phase change data by a frequency offset between the transmitting side and the receiving side, such as Doppler phasing in mobile communication and the like.

Still another object of the present invention is to provide a digital demodulator which can generate accurate demodulated data by performing accurate phase quantization in a stable state of phase information.

A further object of the present invention is to provide a digital demodulator which can provide accurately demodulated data without increasing power consumption which enhancing phase resolution and without increasing a frequency of an operating clock.

In brief, the present invention relates to a digital demodulator including an input terminal, a limiter, a first clock signal source, a counter, a latch circuit, a delay circuit, a subtraction circuit, a second clock signal source, a sampling circuit, and a decoding circuit. A digital phase modulated signal is applied to the input terminal. The limiter converts an amplitude of the digital phase modulated signal applied to the input terminal into a logic level. The first clock signal source supplies a reference clock signal of a constant reference frequency. The counter generates phase information based on the supplied reference clock signal. The latch circuit holds the phase information generated by the counter in response to an output of the limiter. The delay circuit delays the phase information held by the latch circuit for one symbol period. The subtraction circuit subtracts the phase information delayed by the delay circuit from the phase information held by the latch circuit to provide phase change data. The second clock signal source generates a symbol clock signal of a symbol period based on the phase change data. The sampling circuit samples the phase change data in response to the symbol clock signal. The decoding circuit decodes the sampled phase change data to reproduce symbol data.

According to another aspect of the present invention, a digital demodulator includes an input terminal, a phase quantization circuit, a delay circuit, a subtraction circuit, a phase compensation circuit, and a decoding circuit. A digital phase modulated signal is applied to the input terminal. The phase quantization circuit quantizes a phase of the digital phase modulated signal applied to the input terminal to provide phase information. The delay circuit delays the phase information provided from the phase quantization circuit for one symbol section. The subtraction circuit subtracts the phase information delayed by the delay circuit from the phase information provided from the phase quantization circuit to provide phase change data. The phase compensation circuit detects a phase error of the phase change data provided from the subtraction circuit to remove the phase error. The decoding circuit decodes the phase change data to which phase compensation has been applied by the phase compensation circuit to reproduce symbol data.

According to still another aspect of the present invention, a phase compensation circuit for detecting and removing a phase error of phase change data in a digital demodulator includes a phase error detecting circuit, an averaging circuit, a reversible counter, and a subtraction circuit. The phase error detecting circuit detects a phase error of phase change data. The averaging circuit averages the detected phase error. The reversible counter counts up or counts down in response to an output of the averaging circuit. The subtraction circuit subtracts a count value of the reversible counter from the phase change data to provide the resultant data as phase change data to which phase compensation has been applied. The phase error detecting circuit, the averaging circuit, the reversible counter, and the subtraction circuit constitute a feedback loop.

According to a further aspect of the present invention, a digital demodulator includes an input terminal, a limiter, a clock signal source, a counter, a latch circuit, a flip-flop, a delay circuit, a subtraction circuit, and a decoding circuit. A digital phase modulated signal is applied to the input terminal. The limiter converts an amplitude of the digital phase modulated signal applied to the input terminal into a logic level. The clock signal source supplies a reference clock signal of a constant reference frequency. The counter generates phase information based on the supplied reference clock signal. The latch circuit holds the phase information generated by the counter based on the output of the limiter. The flip-flop synchronizes the output of the limiter with the reference clock signal to apply the resultant signal to the latch circuit. The delay circuit delays the phase information held by the latch circuit for one symbol period. The subtraction circuit subtracts the phase information delayed by the delay circuit from the phase information held by the latch circuit to provide phase change data. The decoding circuit decodes the phase change data to reproduce symbol data.

According to a further aspect of the present invention, a digital demodulator includes an input terminal, a limiter, a clock signal source, a counter, a flip-flop, a latch circuit, a delay circuit, a subtraction circuit, and a decoding circuit. A digital phase modulated signal is applied to an input terminal. The limiter converts an amplitude of the digital phase modulated signal applied to the input terminal into a logic level. The clock signal source supplies a reference clock signal of a constant reference frequency. The counter generates first phase information based on the supplied reference clock signal. The flip-flop holds the output of the limiter for every one period at a rising or falling edge of the reference clock signal to provide the held signal as second phase information. The latch circuit, based on the output of the limiter, holds first and second phase information in parallel to supply the held information as phase information. The delay circuit delays the phase information held by the latch circuit for one symbol period. The subtraction circuits subtracts the phase information delayed by the delay circuit from the phase information held by the latch circuit to provide phase change data. The decoding circuit decodes the phase change data to reproduce symbol data.

A main advantage of the present invention is that an entire digital demodulator can be constituted with digital circuits because internal generation of a symbol clock signal based on phase change data makes it unnecessary to separately provide a circuit for extracting the symbol clock signal from an input digital phase modulated signal.

Another advantage of the present invention is that a adverse influence on demodulating operation caused by a reference frequency offset between the transmitting side and the receiving side and Doppler phasing in mobile communication can be eliminated because phase compensation is applied to phase change data in detected one symbol period.

Still another advantage of the present invention is that accurate demodulating operation is ensured because each component constituting a digital demodulator can be prevented from operating in an unstable state of phase data.

A further advantage of the present invention is that a sufficient resolution of phase quantization can be maintained while suppressing an increase in power consumption.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram schematically showing the manner of converting input digital phase modulated data into symbol data.

FIG. 6 is a table showing the relation between the symbol data and the phase change data (differential coding rules).

FIG. 17 is a table showing the relation among the amount of phase change, the phase change data, and phase error data in the first embodiment of the present invention.

FIG. 19 is a table showing the relation between a phase error and a frequency offset for the modification example of FIG. 18.

FIG. 30 is a schematic block diagram showing a modification of the third embodiment of the present invention shown in FIG. 28.

DESCRIPTION OF THE PREFERRED EMBODIMENTS

Figure 8:
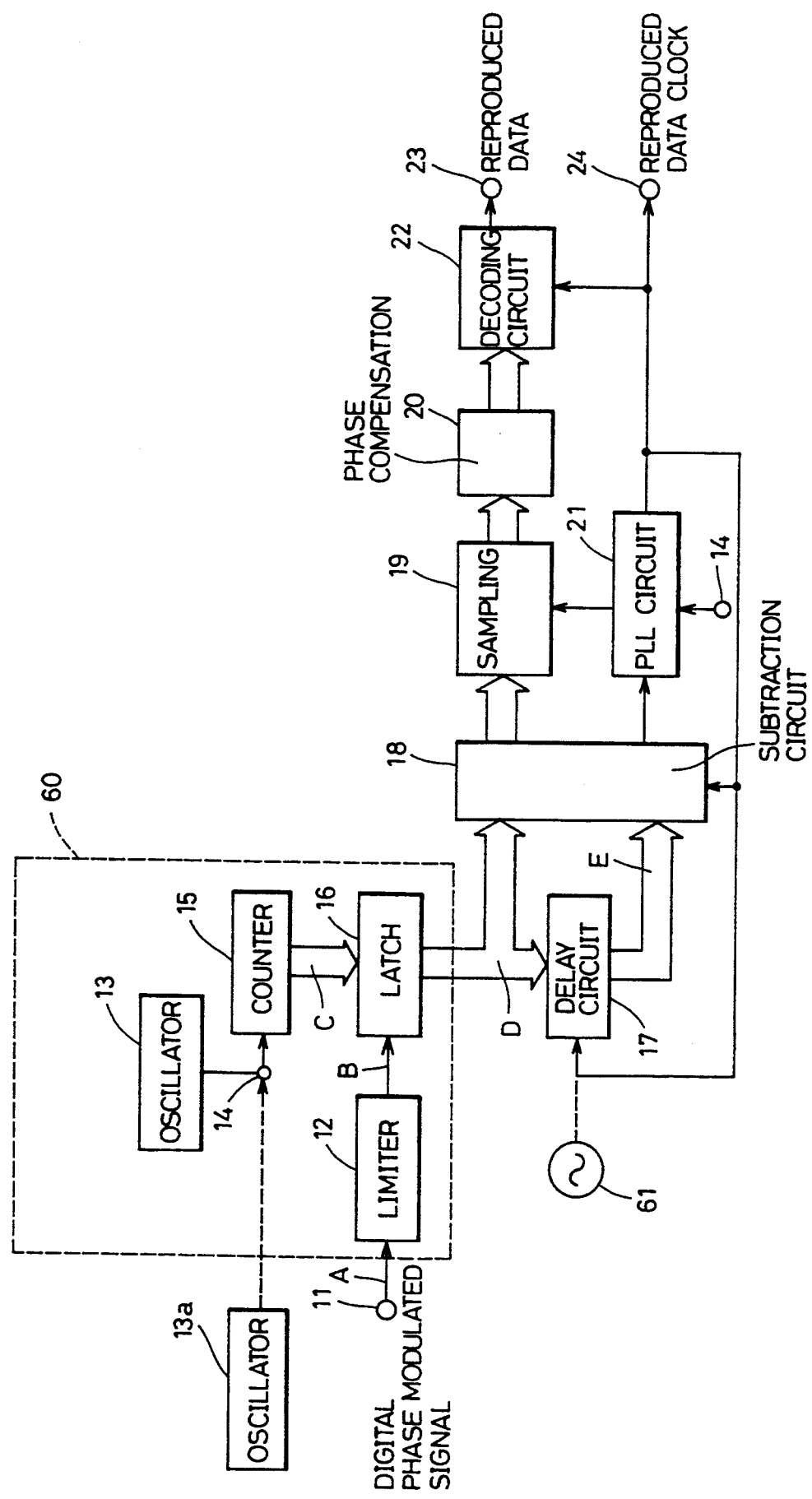
FIG. 8 is a schematic block diagram showing a configuration of the digital demodulator according to a first embodiment of the present invention.

FIG. 8 is a schematic block diagram showing a configuration of the digital demodulator according to the first embodiment of the present invention. Referring to FIG. 8, the digital demodulator includes an input terminal 11 to which a received digital phase modulated signal is applied, a limiter 12 for limiting an amplitude of the applied digital phase modulated signal and for converting that signal into a binary digital signal, an oscillator 13 for generating a clock signal, a counter 15 for counting the clock signal applied through input terminal 14 from oscillator 13 in order to provide a count value as phase information, a latch circuit 16 for holding the count output (phase information) of counter 15 in response to an output of limiter 12, a delay circuit 17 for delaying an output of latch circuit 16 for one symbol period (also referred to hereinafter as "section") in response to a data clock signal, which will be described later, a subtraction circuit 18 for subtracting within a data clock signal period a count value delayed by one symbol section by delay circuit 17 from a count value held by latch circuit 16, a sampling circuit 19 for sampling phase change data provided from subtraction circuit 18 based on a symbol clock signal, which will be described later, a phase compensation circuit 20 for performing phase compensation with respect to the phase data sampled by sampling circuit 19, a PLL (phase locked loop) circuit 21 responsive to an output of subtraction circuit 18 for reproducing a symbol clock signal of a predetermined period and a data clock signal formed by frequency-multiplying the symbol clock signal, a decoding circuit 22 for decoding the phase change data to which phase compensation has been applied by phase compensation circuit 20 to form symbol data and further for converting the formed symbol data into serial data so as to provide the resultant data as reproduced data, a data output terminal 23 for providing data reproduced by decoding circuit 22, and a data clock output terminal 24 for providing the data clock signal reproduced by PLL circuit 21.

It should be noted that limiter 12, oscillator 13, counter 15, and latch circuit 16 constitute a direct phase quantization circuit 60. An oscillator 13a provided outside the digital demodulator may be used as oscillator 13, in the case of which, as shown by dotted lines, a clock signal is externally supplied to counter 15 through input terminal 14.

Figure 9:
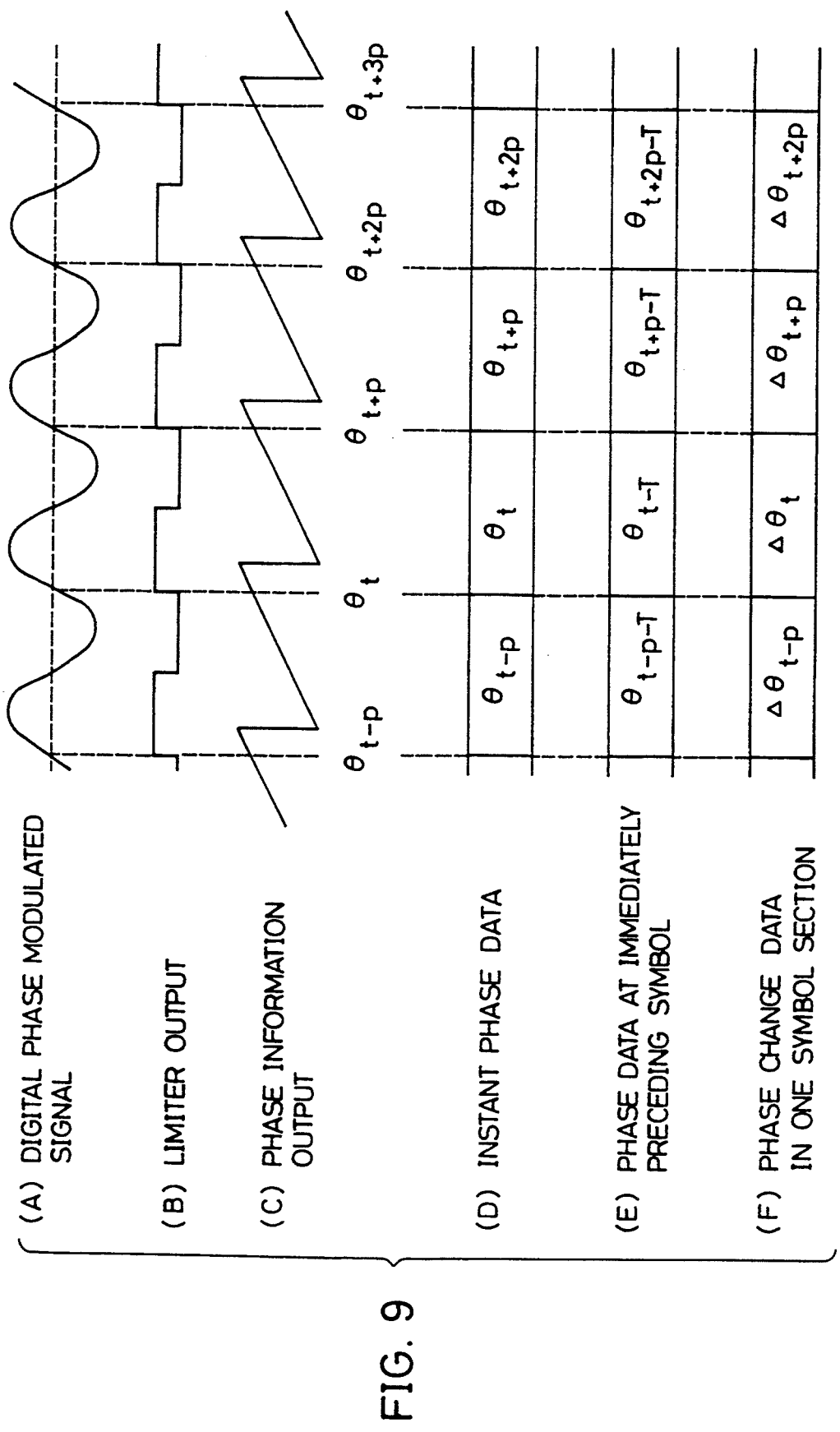
FIG. 9 is a timing chart explaining an operation of the first embodiment shown in FIG. 8.

FIG. 9 is a timing chart explaining an operation of the first embodiment shown in FIG. 8.

Referring to FIGS. 8 and 9, description will be given on operation of the digital demodulator according to the first embodiment of the present invention. In the first embodiment shown in FIG. 8, it is assumed that a $\pi/4$ shift QPSK signal (waveform (A) in FIG. 9) having a data rate of 42 kbit/s and a carrier frequency of 450 kHz is applied to input terminal 11 as an input digital phase modulated signal A. The input digital phase modulated signal A has its amplitude limited by limiter 12 and is converted into a digital signal B of a binary value as shown in waveform (B) in FIG. 9.

Counter 15 performs a counting operation in response to a clock signal from oscillator 13 to provide phase information C as shown in waveform (C) in FIG. 9. If an oscillation frequency of oscillator 13 is set to 14.4 MHz, for example, 32 times of the carrier frequency 450 kHz of the digital phase modulated signal, counter 15 1/32 frequency-divides the output of oscillator 13 and provides a 5-bit parallel count value.

Figure 10:
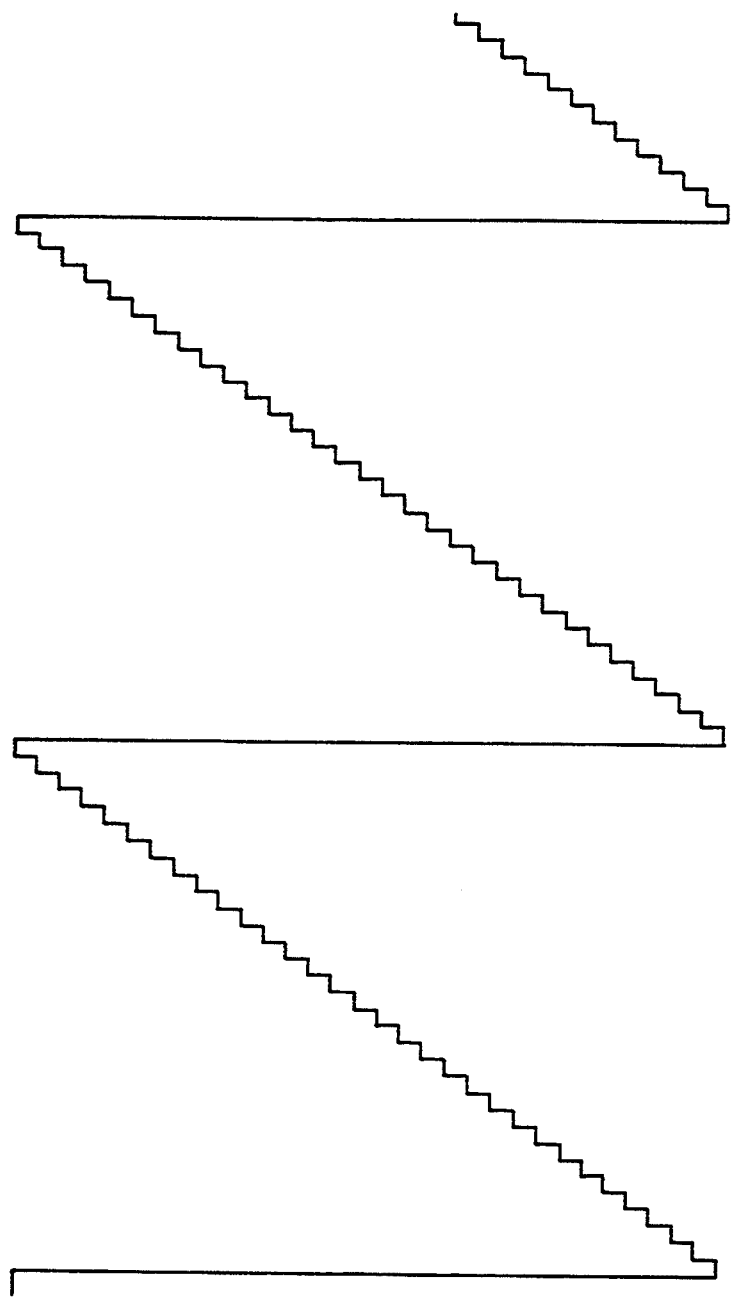
FIG. 10 is a diagram showing an enlarged waveform of phase information shown in FIG. 9.
Figure 11:
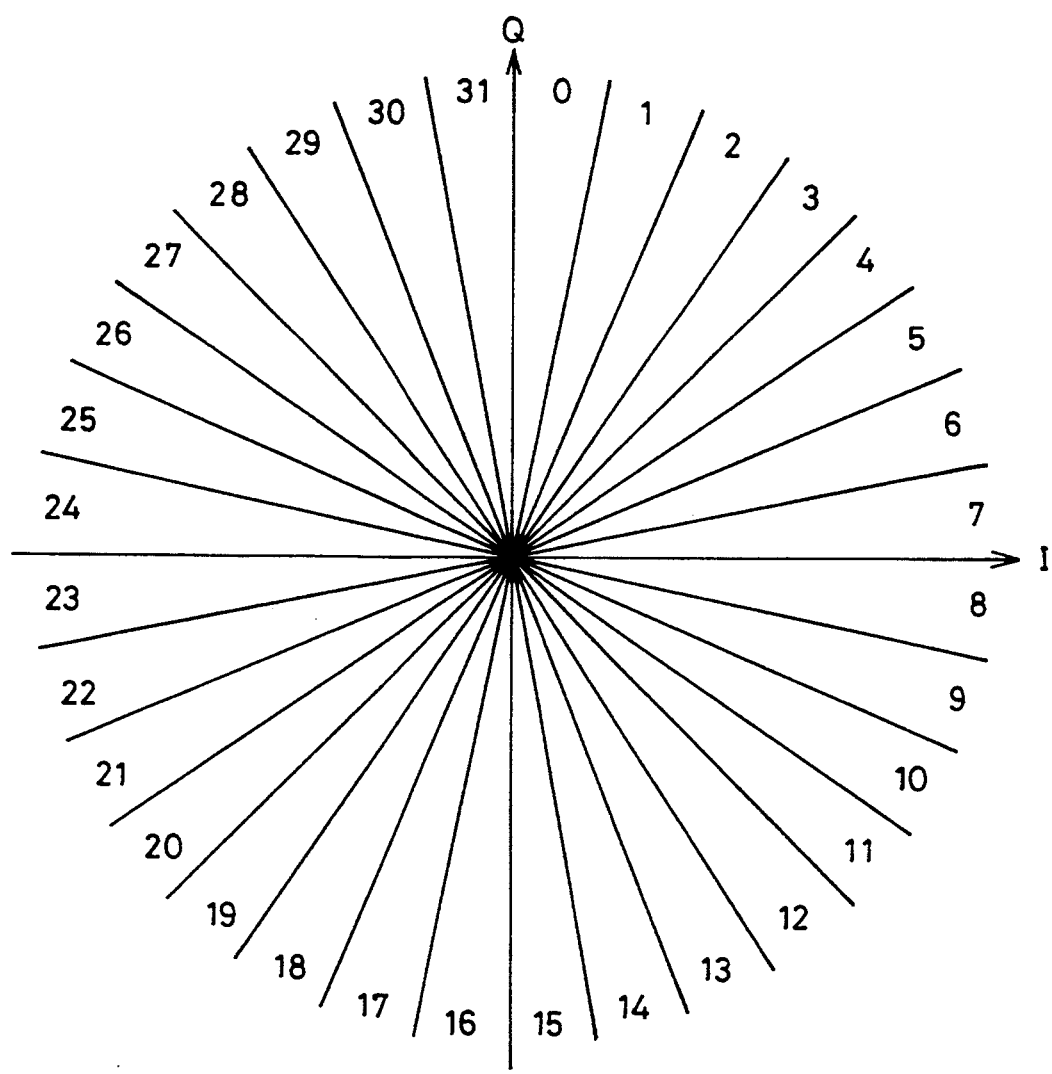
FIG. 11 is a diagram schematically showing a phase of the phase information according to the first embodiment of the present invention.

FIG. 10 is a diagram showing an enlarged waveform of the count output (phase information) C of counter 15 shown in waveform (C) in FIG. 9. As shown in FIG. 10, the phase information provided from counter 15 in fact does not advance in a smooth straight line manner but rather in a stepped manner. When the phase resolution is $2\pi/32$ as described above, the phase information output provided from counter 15 assumes values in a range of 0 to 31 in decimal representation, and shows a phase as shown in FIG. 11. In FIG. 11, it should be noted that the values 0 to 31 of the phase information output are counted up in the direction in which a phase angle decreases.

Latch circuit 16 latches the output of counter 15 (waveform (C) in FIG. 9) as instant phase data as shown in waveform (D) in FIG. 9 in response to rising of the output of limiter 12 (waveform (B) in FIG. 9). Since latch circuit 17 delays the instant phase data held by latch circuit 16 by one symbol section T, phase data preceding by the one symbol section T as shown in waveform (E) in FIG. 9 is held by this delay circuit. Subtraction circuit 18 subtracts the phase data of an immediately preceding symbol section held by delay circuit 17 from the instant phase data (waveform (D) in FIG. 9) held by latch circuit 16 to evaluate the phase change data for every one symbol section as shown by waveform (F) in FIG. 9. In the embodiment shown in FIG. 8, delay circuit 17 and subtraction circuit 18 both are constituted to operate based on the data clock signal from PLL circuit 21. Therefore, the outputs of delay circuit 17 and subtraction circuit 18 are provided only in a data clock period, and they are not necessarily provided in response to every rising edge appearing at the output of limiter 12.

Figure 12:
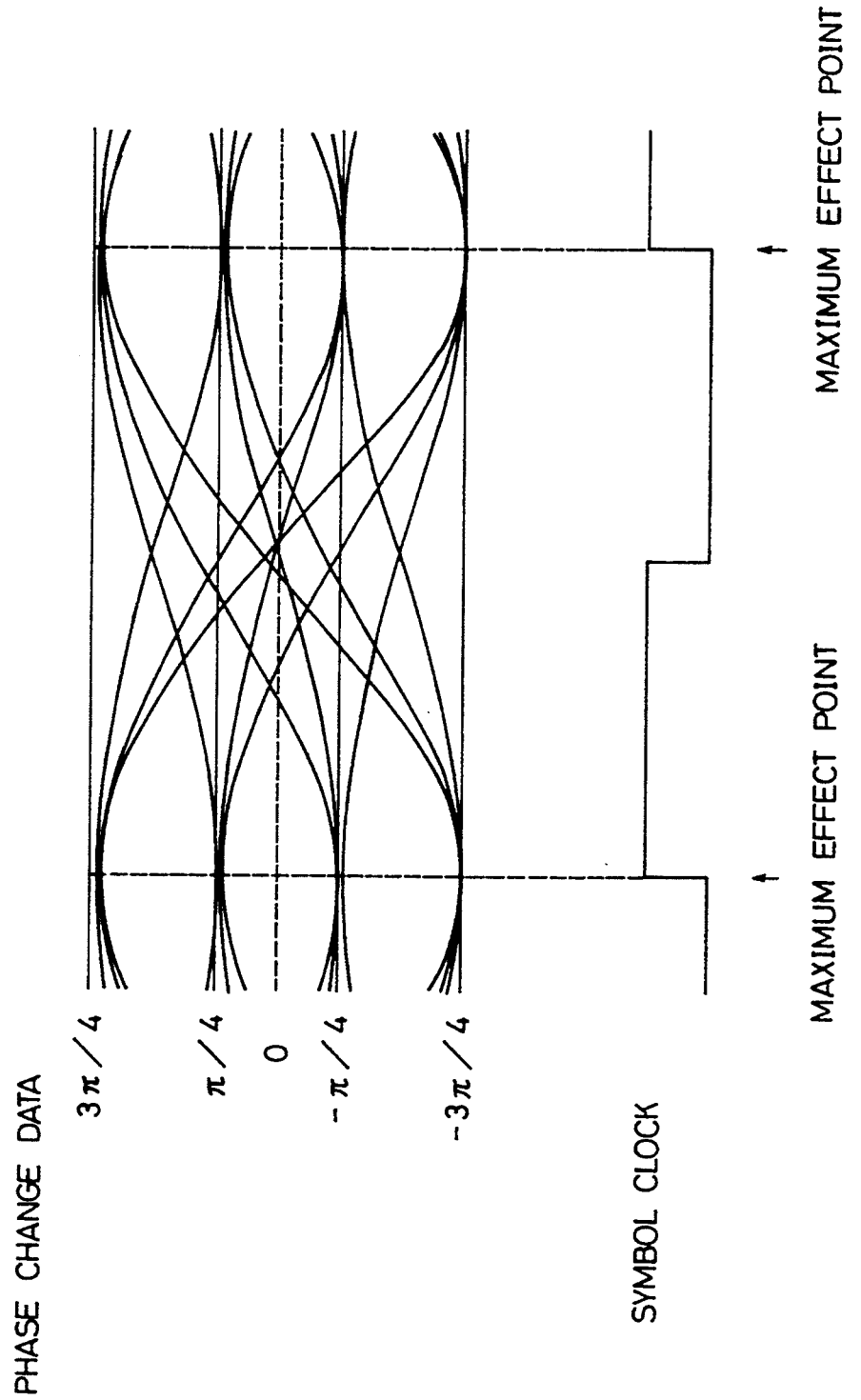
FIG. 12 is a diagram showing an eye pattern of the phase change data obtained according to the first embodiment of the present invention.

When the phase change data provided from subtraction circuit 18 is synchronized with the symbol clock signal, an eye pattern as shown in FIG. 12 is obtained. As shown in FIG. 12, the phase change data is converged to four values of $3\pi/4$, $\pi/4$, $-\pi/4$, and $-3\pi/4$ at each maximum effect point (rising edge of the symbol clock signal).

In FIG. 12, it can be assumed that each zero crossing point of the phase change data is, on average, in the center of adjacent symbol determination points. Therefore, PLL circuit 21 (FIG. 8) controls a phase of a symbol clock signal to be formed so that, on average, a timing of sign inversion of the phase change data and a timing of falling edges of the symbol clock signal correspond to each other. PLL circuit 21 applies thus formed symbol clock signal to sampling circuit 19. At the same time, PLL circuit 21 forms a data clock signal by frequency-multiplying the symbol clock signal by two to provide the resultant signal, this resultant signal being provided to data clock output terminal 24 as well as to delay circuit 17, subtraction circuit 18, and decoding circuit 22.

Figure 13:
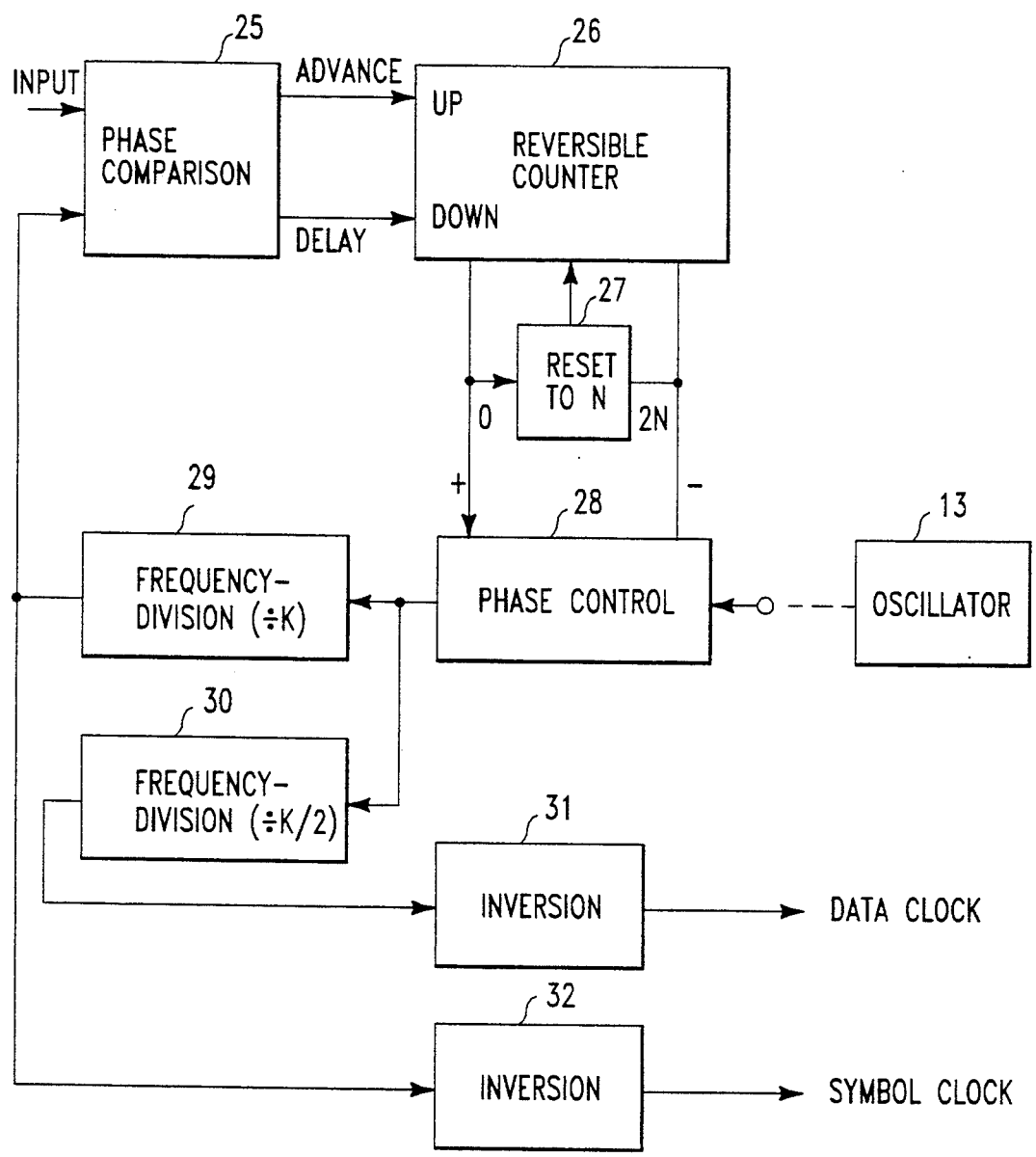
FIG. 13 is a block diagram showing an example of a circuit configuration of a PLL circuit of the first embodiment shown in FIG. 8.

FIG. 13 is a block diagram showing one example of a circuit configuration of such PLL circuit 21. Referring to FIG. 13, a phase comparison circuit 25 receives the output (phase change data) of subtraction circuit 18 (FIG. 8) and the output (symbol clock signal) of a frequency-dividing circuit 29, which will be described later, to detect a phase difference between a timing of sign inversion (zero crossing point) of the phase change data and a phase of an output symbol clock signal. Phase comparison circuit 25 generates data representing the phase difference by binary values of "advance" and "delay" and applies the same to reversible counter 26 having N set as a preset value. Reversible counter 26 counts up or counts down in response to the binary valued data to generate a control signal of "−" when the count value attains 2N and a control signal of "+" when the count value attains 0. A reset circuit 27 resets the count value of reversible counter 26 to N simultaneously with generation of such a control signal.

A phase control circuit 28 receives a clock signal through terminal 14 from oscillator 13 (FIG. 8) to control the number of clock signal pulses passing therethrough according to the output of reversible counter 26. In more detailed description, phase control circuit 28 adds one clock pulse to the clock signal pulses passing therethrough when reversible counter 26 generates a control signal of "+", and removes one clock pulse from clock signal pulses passing therethrough when reversible counter 26 generates a control signal of "−", whereby phase control circuit 28 carries out phase control. Frequency-dividing circuits 29 and 30 each carries out counting, with respect to the phase control output provided from phase control circuit 28 and having the number of clock pulses controlled, to control a phase timing of the frequency-divided output. More specifically, frequency-dividing circuit 29 1/K frequency-divides the output of phase control circuit 28 to form a symbol clock signal, and frequency-dividing circuit 30 generates a data clock signal formed by frequency-multiplying the symbol clock signal by two. The symbol clock signal and the data clock signal are then sign-inverted by inversion circuits 32 and 31, respectively. As a result of phase control by PLL circuit 21 as described above, a phase of the symbol clock signal is substantially synchronized with a timing of sign inversion of the evaluated phase change data.

Delay circuit 17 may be constituted to be driven by a clock signal supplied from an independent clock signal source 61 as shown in FIG. 8. However, by constituting delay circuit 17 so that it may be driven by a data clock signal provided from PLL circuit 21 as described above, a feedback loop is formed by delay circuit 17, subtraction circuit 18, and PLL circuit 21, thereby providing, in all likelihood, a more reliable decoding operation.

When the carrier frequency of the input digital phase modulated signal is exactly 1/32 of the oscillation frequency of oscillator 13, sampling circuit 19 latches the phase change data applied from subtraction circuit 18 at rising edges (maximum effect points) of the symbol clock signal provided from PLL circuit 21 and applies the latch output of any of $3\pi/4$, $\pi/4$, $-\pi/4$, or $-3\pi/4$ to phase compensation circuit 20.

Figure 14:
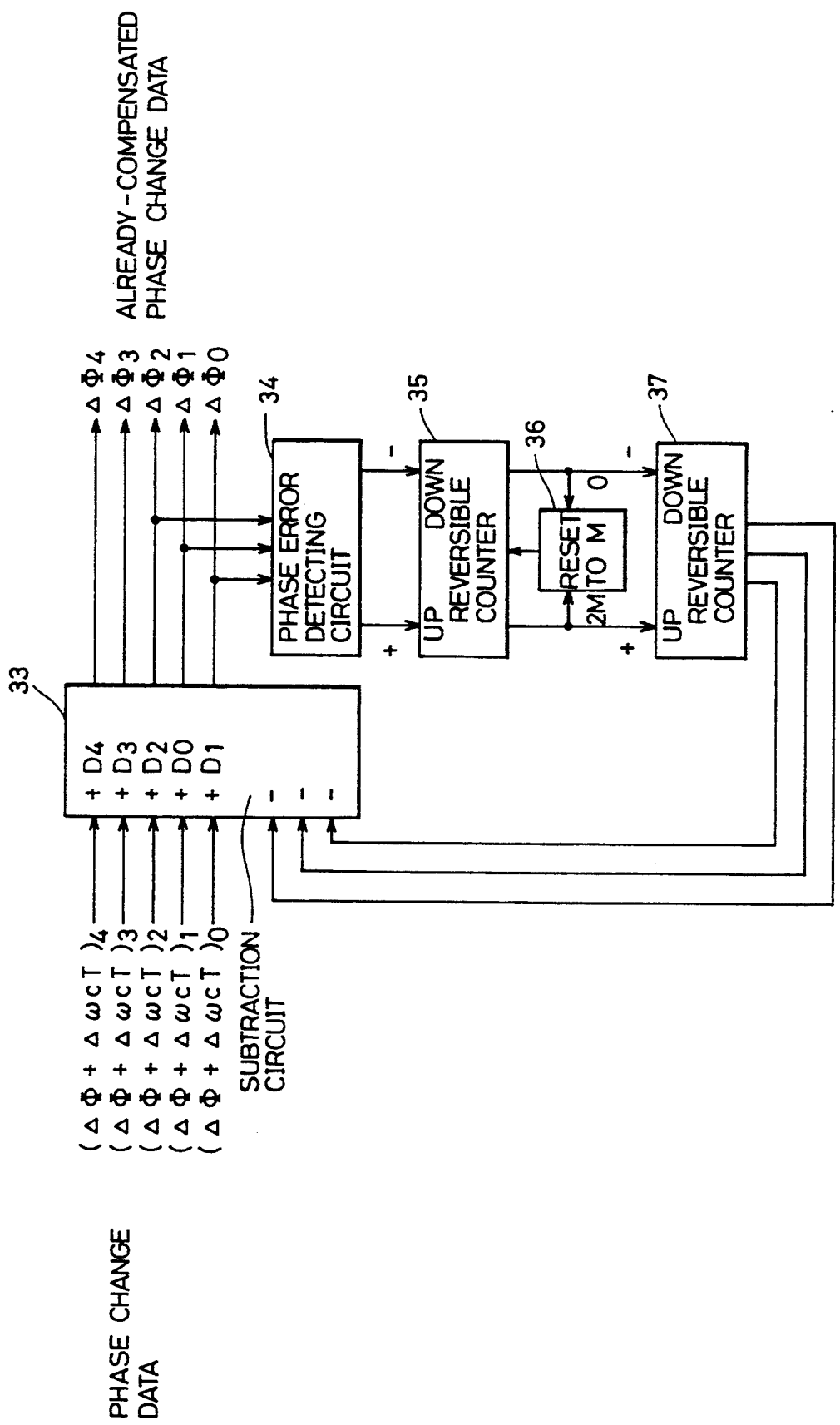
FIG. 14 is a block diagram showing an example of a circuit configuration of a phase compensation circuit of the first embodiment shown in FIG. 8.

FIG. 14 is a block diagram showing one example of a circuit configuration of phase compensation circuit 20. As described above, in mobile communication in general, a frequency offset (deviation) $\Delta\omega_c$ is caused by Doppler phasing and frequency differences between reference oscillators on the transmitter side and on the receiver side. Taking the frequency deviation $\Delta\omega_c$ into consideration, the above-described equation (1) is expressed as follows.

$$\begin{aligned} S(t) &= A(t)\cos\{(\omega_c + \Delta\omega_c)t + \Phi(t)\} \\ &= A(t)\cos\{\omega_c t + \Delta\omega_c t + \Phi(t)\} \\ &= A(t)\cos\{\omega_c t + \theta(t)\} \end{aligned} \qquad (7)$$

wherein $\theta(t) = \Delta\omega_c t + \Phi(t)$.

In the equation (7), when a phase at $t=kT$ is $\theta(t)=\theta_k$, the following equation (8) can be obtained.

$$\theta_k = \Delta\omega_k T + \Phi_k \qquad (8)$$

When a phase at an immediately preceding symbol section, that is, at $t=kT-T$, is $\theta(t)=\theta_{k-1}$, the following equation (9) is obtained.

$$\begin{aligned} \theta_{k-1} &= \Delta\omega_c(kT - T) + \Phi_{k-1} \\ &= \Delta\omega_c kT - \Delta\omega_c T + \Phi_{k-1} \end{aligned} \qquad (9)$$

As a result, the phase change $\Delta\theta_k$ in one symbol section is as expressed by the following equation (10).

$$\begin{aligned} \Delta\theta_k &= \theta_k - \theta_{k-1} \\ &= \Phi_k - \Phi_{k-1} + \Delta\omega_c T \\ &= \Delta\Phi(X_k, Y_k) + \Delta\omega_c T \end{aligned} \qquad (10)$$

When the frequency deviation $\Delta\omega_c$ exists, the output of latch circuit 16 (FIG. 8) is $\theta_k$ as described above, and the output of delay circuit 17 (FIG. 8) is $\Delta\theta_{k-1}$, whereby the output of subtraction circuit 18 (FIG. 8) is $\Delta\theta_k$. According to the above-described equation (10), an eye pattern of the phase change data is as shown in FIG. 15 when the frequency deviation $\Delta\omega_c$ exists in the carrier frequency of the input digital phase modulated signal.

Figure 15:
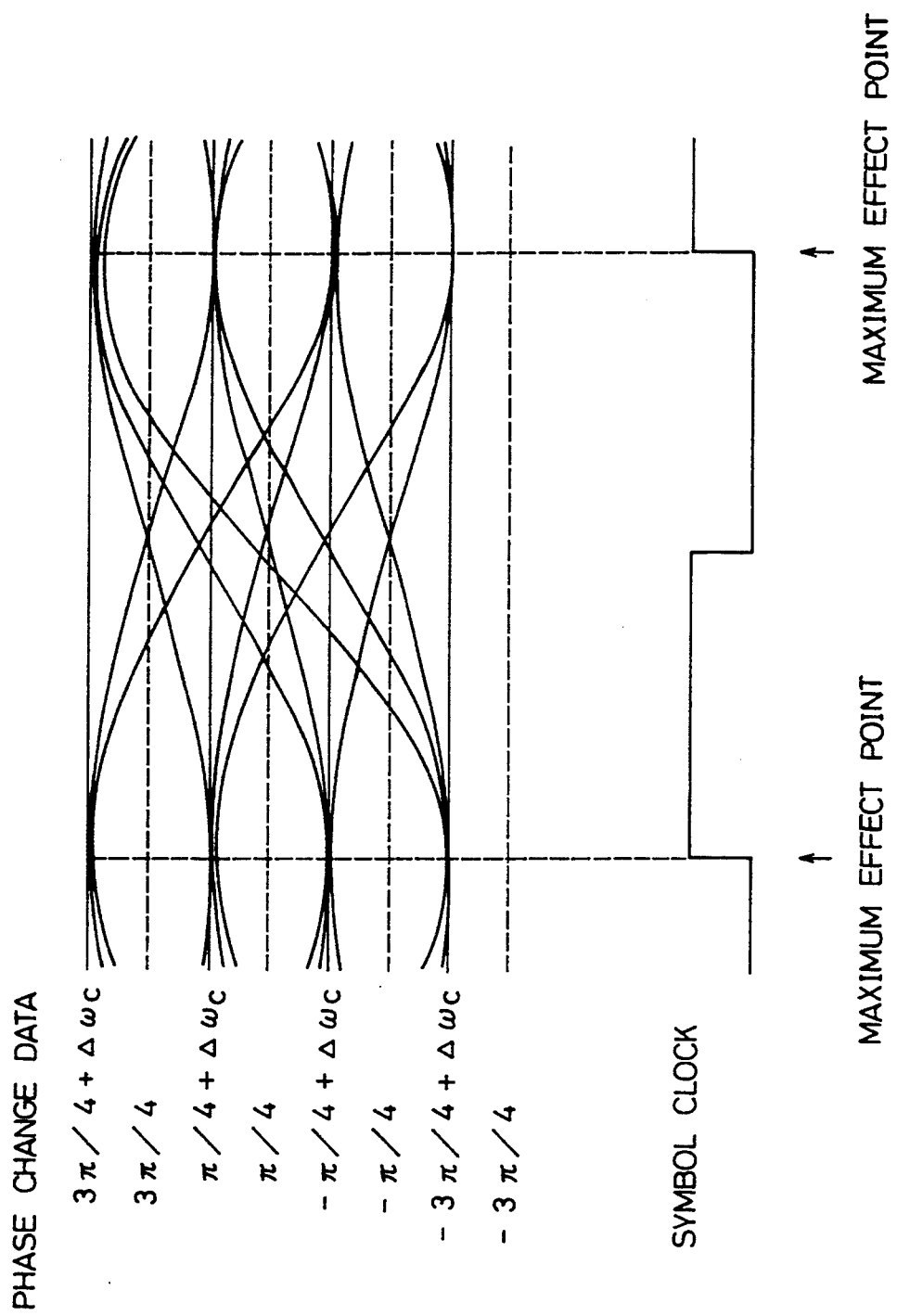
FIG. 15 is a diagram showing an eye pattern of the phase change data obtained in the case where a phase error component exists.

As described above, when the frequency deviation $\Delta\omega_c$ exists in the carrier frequency of the input digital phase modulated signal, the phase change data is converged to four values of $3\pi/4+\Delta\omega_c T$, $\pi/4+\Delta\omega_c T$, $-\pi/4+\Delta\omega_c T$ and $-3\pi/4+\Delta\omega_c T$ at each maximum effect point (a rising edge of a symbol clock signal) as shown in FIG. 15. As a result, a direct current component $\Delta\omega_c T$, that is, a phase error component, is to be superimposed on every phase change data.

Figure 16:
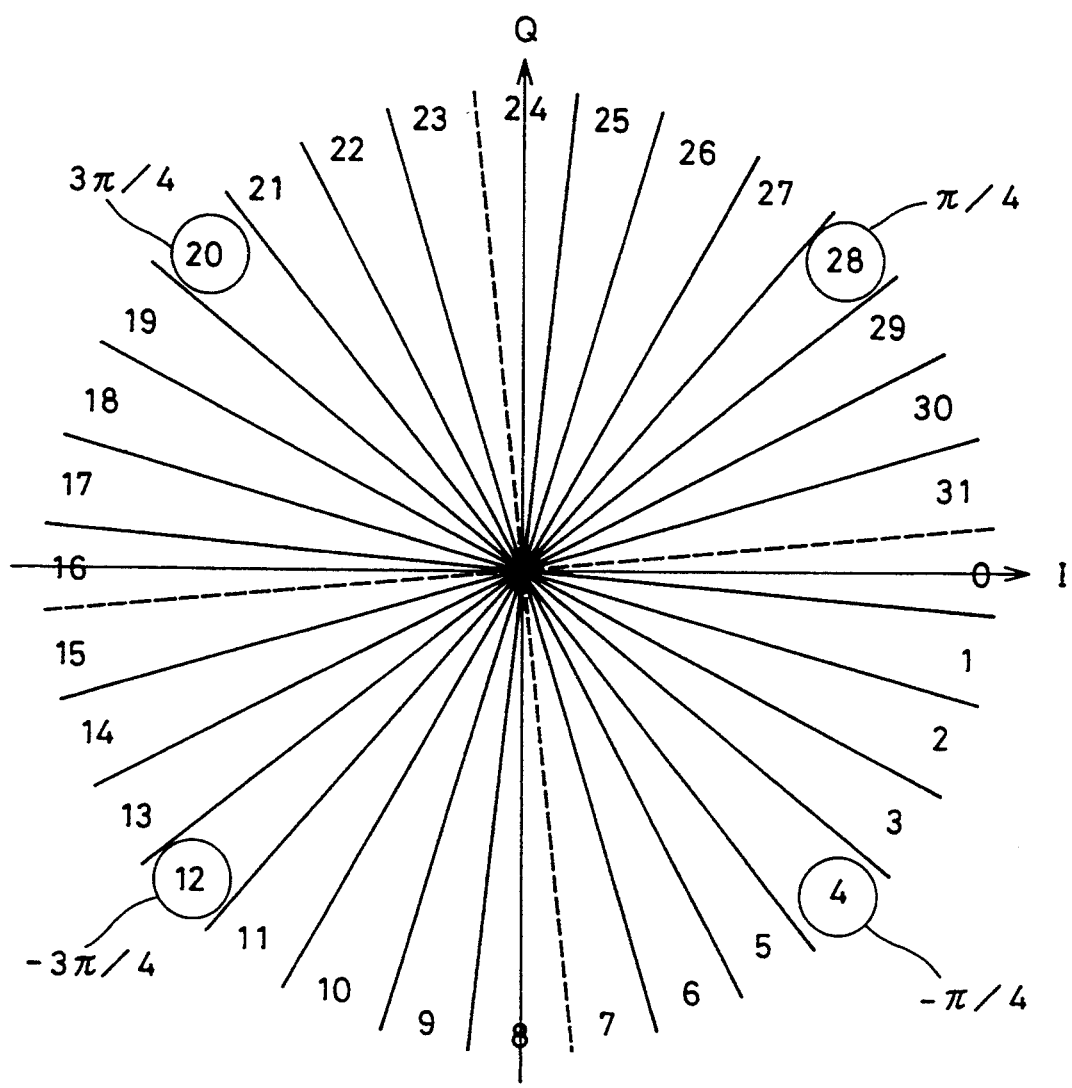
FIG. 16 is a diagram schematically showing a phase of the phase information in the case where the phase error component exists.

In this case, when the phase change data in one symbol section provided from subtraction circuit 18 is sampled at each maximum effect point by sampling circuit 19 (see FIG. 8), the phase change data of 0 to 31 in decimal representation is obtained, as shown in FIG. 16. As is shown by circles in FIG. 16, when normal phase change data is obtained, "28", "20", "4" and "12" correspond to $\pi/4$, $3\pi/4$, $-\pi/4$, and $-3\pi/4$, respectively. However, when the above-described phase error component is included in the obtained phase change data, the data takes values other than the normal four values already described.

When there exits a phase error component because a frequency of 1/32 of the oscillation frequency of oscillator 13 is lower than the carrier frequency of the digital phase modulated signal, the phase change data is deviated into a clockwise direction from normal values as shown in FIG. 16. Conversely, when there exists a phase error component because a frequency of 1/32 of the oscillation frequency of oscillator 13 is higher than the carrier frequency, the phase change data is deviated into a counterclockwise direction from normal values. Therefore, when the phase change data is deviated into the clockwise direction from normal values, positive phase error data is generated, and when the phase change data is deviated into the counterclockwise direction, negative phase error data is generated.

Generation of the positive phase error data means that a negative phase error component is generated as is clear from the relation between a count value and a phase amount of FIG. 11. More specifically, the sign of the phase data and the sign of the phase error component are opposite to each other.

In the embodiment to be described hereinafter, as shown in FIG. 16, the phase error component is removed by detecting the phase error data in an angle range of $\pi/2$ obtained by division along the broken lines with respect to each normal phase data as a center and subtracting the detected phase error data from the phase change data.

FIG. 17 is a table for explaining the principle of detection of the phase error data. In the table of FIG. 17, the first column shows the amount of phase change (angle) in one symbol section, the second column shows the phase change data (output of subtraction circuit 18) corresponding to each amount of phase change in decimal representation and in binary representation ($D_4$, $D_3$, $D_2$, $D_1$, $D_0$), and the third column shows values of the lower three bits ($D_2$, $D_1$, $D_0$) of the binary-represented phase change data in decimal representation and in binary representation. In this table, increase of the amount of phase change and increase of the phase change data are in the direction opposite to each other.

When the third column of FIG. 17 is compared with the angle range of $\pi/2$ enclosed by the broken line in FIG. 16, it is understood that values of the lower three bits ($D_2$, $D_1$, $D_0$) change just in a range of 0 to 7 in respective angle ranges. Therefore, the present embodiment is structured to change a level of the phase error component by considering that the phase error component of "+" is generated when the lower three bits of the phase change data equal 0 to 3, and that the phase error component of "−" is generated when the lower three bits of the phase change data equal 5 to 7.

In phase compensation circuit 20 according to the embodiment shown in FIG. 14, a closed loop is so structured as to remove a phase error component by detecting the sign of the phase error component based on the lower three bits ($D_2$, $D_1$, $D_0$) of the phase change data and by grasping the tendency of the phase error component, by reversible counting based on the sign, to correct the phase error data to be detected as well as to subtract the detected phase error data from the phase changed data.

When described in detail with reference to FIG. 14, a phase error detecting circuit 34 receives data of the lower three bits of already-compensated phase change data provided from subtraction circuit 33. Phase error detecting circuit 34 generates a detect output of 0 when the value of the lower three bits is 4 in decimal representation, considering that there is no phase error. Phase error detecting circuit 34 generates a detect output of "+" when the value of the lower three bits is 0 to 3, and generates a detect output of "−" when the value of the lower three bits is 5 to 7. Phase error detecting circuit applies these outputs to reversible counter 35. Reversible counter 35 counts up when a detect signal of "+" is applied from phase error detecting circuit 34, and counts down when a detect signal of "−" is applied therefrom. Reversible counter 35 has its initial value set to M. Reversible counter 35 is constituted such that it provides a count up pulse when a count value attains 2M, and that it provides a count down pulse when a count value attains 0. A reset circuit 36 resets the value of reversible counter 35 to M when either of the count up pulse or the count down pulse is generated. Reversible counter 35 and reset circuit 36 serve as averaging means for averaging the detected phase error over several symbols.

A reversible counter 37, which has been set to 0 in its initial state, counts up and counts down when a count up pulse and a count down pulse are applied from reversible counter 35, respectively. The count value of reversible counter 37 is limited to +4 to −3 according to a phase error detecting range. Therefore, even if a count up pulse is further applied when the current count output is +4, the count output does not attain +5 but remains at +4. Similarly, even if a count down pulse is applied when the current count output is −3, the count output does not attain −4 but remains at −3. Malfunction is prevented by such limitation. The output of reversible counter 37 is applied to subtraction circuit 33 as phase error data. Subtraction circuit 33 subtracts the phase error data from the phase change data supplied from sampling circuit 19 (FIG. 8) to provide already-compensated phase change data. As described above, a feedback loop is formed of subtraction circuit 33, phase error detecting circuit 34, reversible counter 35, reset circuit 36, and reversible counter 37 to carry out phase compensation of the phase change data.

Phase compensation circuit 20 may be provided in the succeeding stage or the preceding stage of sampling circuit 19. The phase compensation circuit according to the present invention is effective in eliminating the influence caused by the phase error even if the circuit is adopted in a conventional structure as long as the structure is a delay detection type digital demodulator.

More specifically, in the digital demodulator according to the first embodiment of the present invention shown in FIG. 8, the phase compensation circuit according to the present invention is employed in a digital demodulator of a type in which a symbol clock signal is internally formed in PLL circuit 21. However, the phase compensation circuit according to the present invention shown in FIG. 14 can be employed in a conventional digital demodulator which uses a symbol clock signal formed in advance, as shown in FIG. 7.

Figure 1:
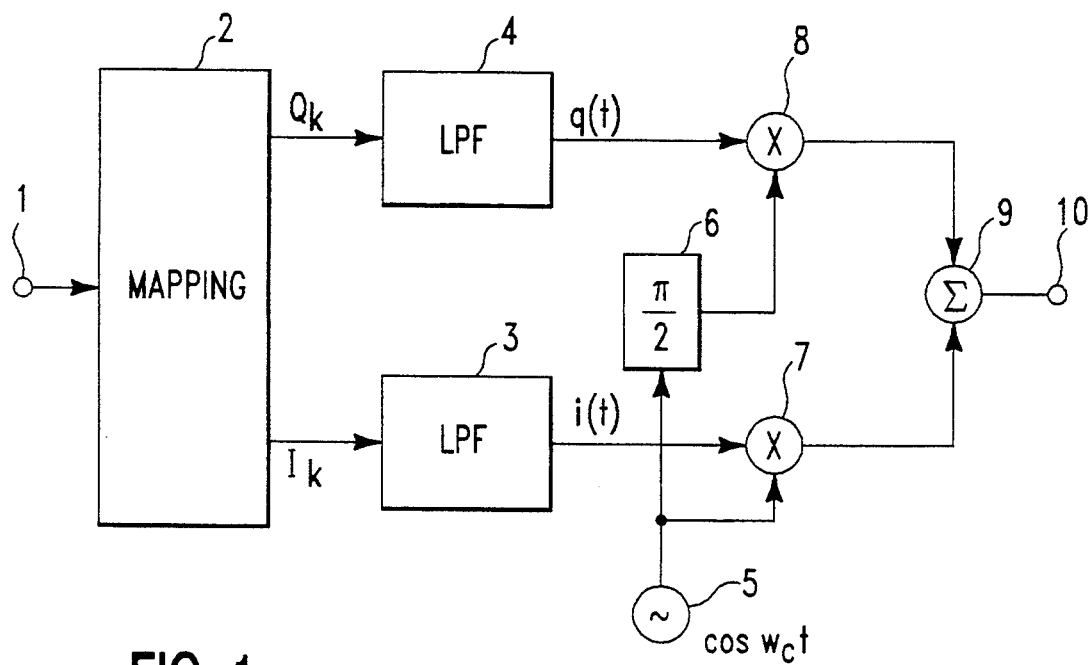
FIG. 1 is a block diagram conceptually showing the principle of a quadrature modulator.
Figure 2:
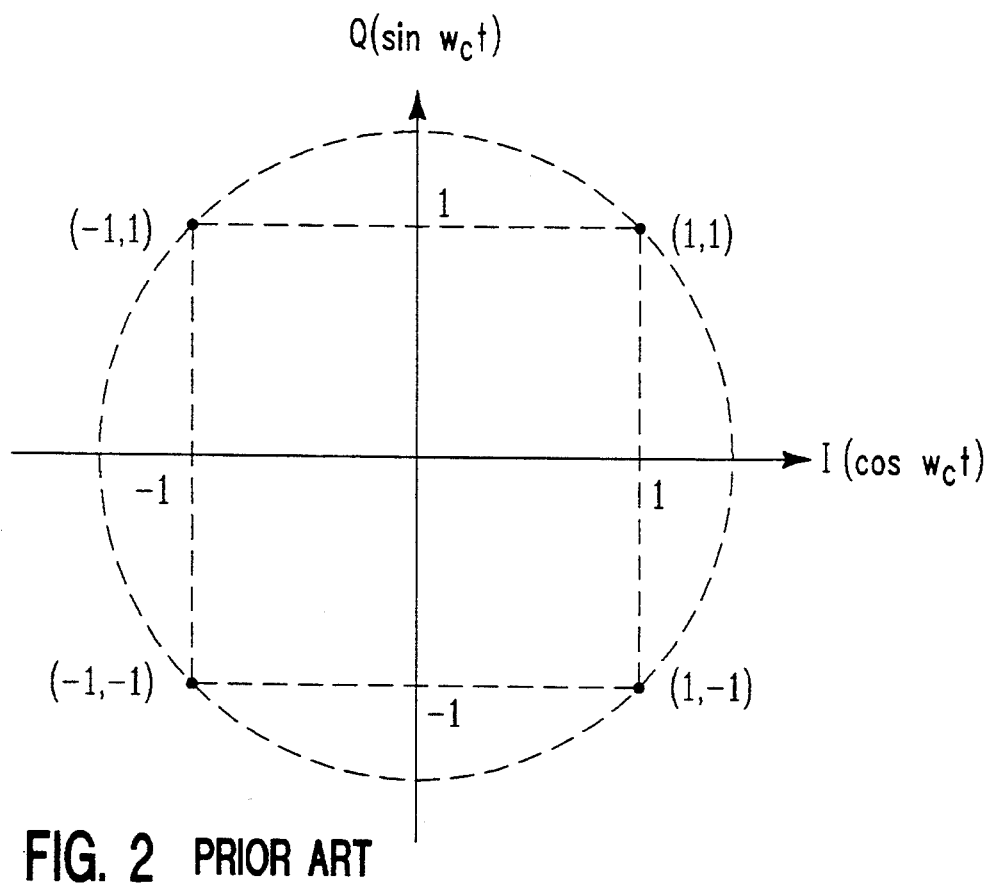
FIG. 2 is a spatial diagram conceptually showing the principle of the quadrature modulator.
Figure 3:
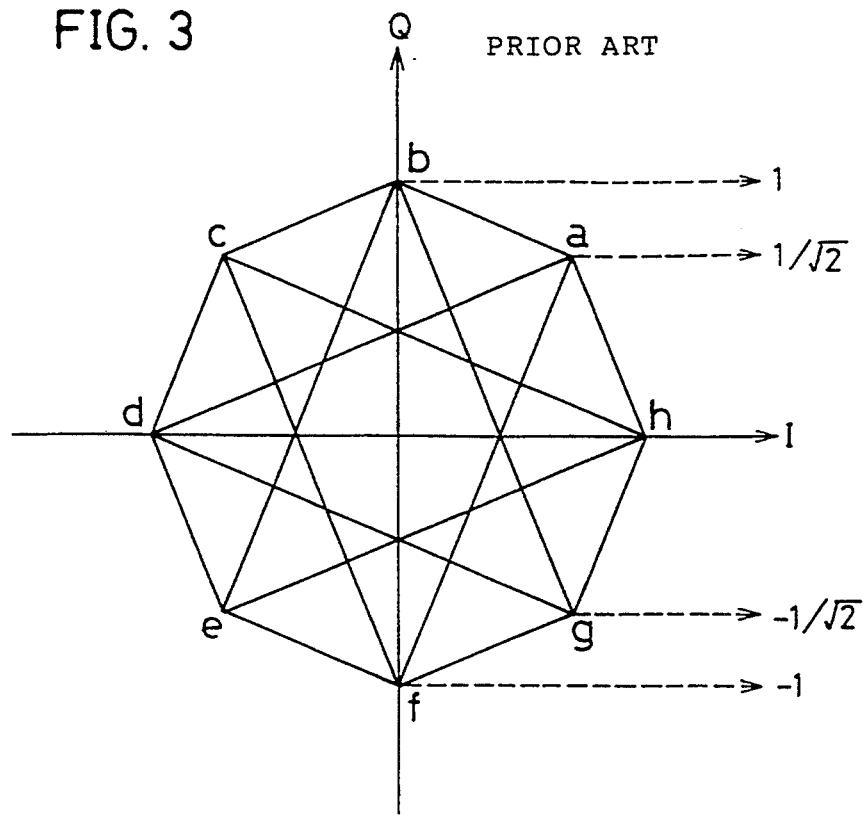
FIG. 3 is a diagram conceptually explaining the principle of generation of a $\pi/4$ shift QPSK signal.
Figure 4:
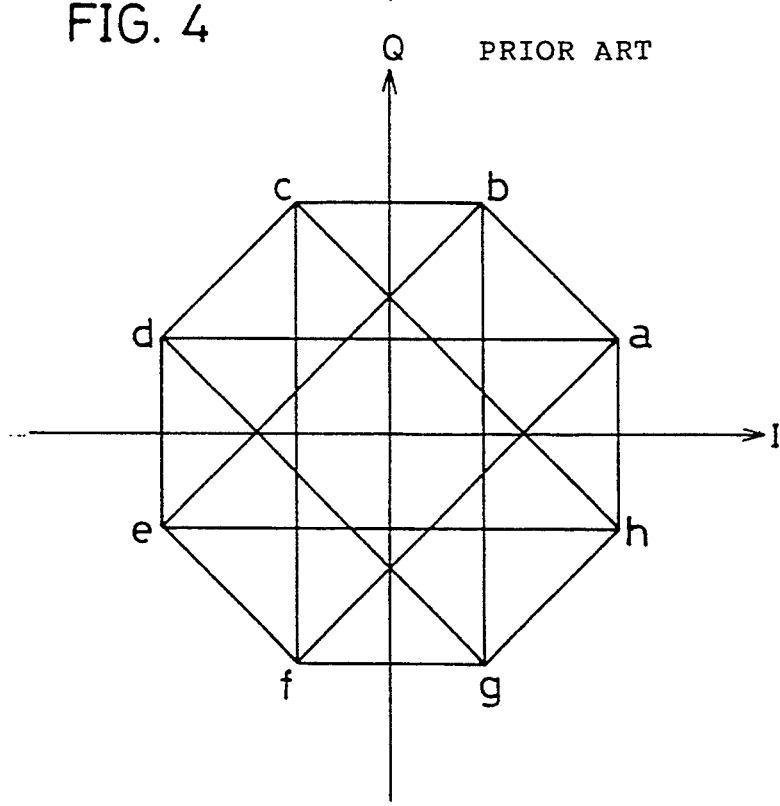
FIG. 4 is a diagram conceptually explaining $\pi/4$ shift QPSK modulation using differential encoding.
Figure 7:
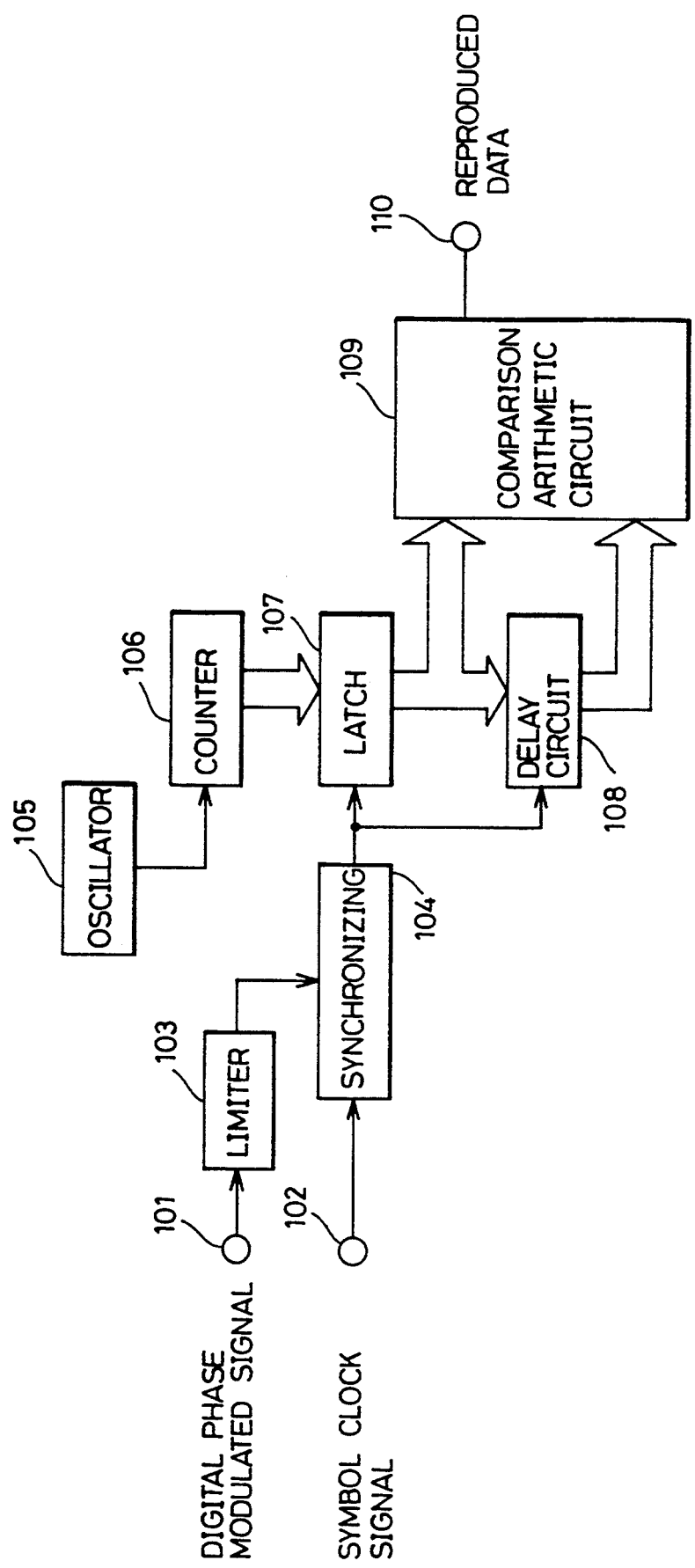
FIG. 7 is a schematic block diagram showing a configuration of a conventional digital demodulator.
Figure 18:
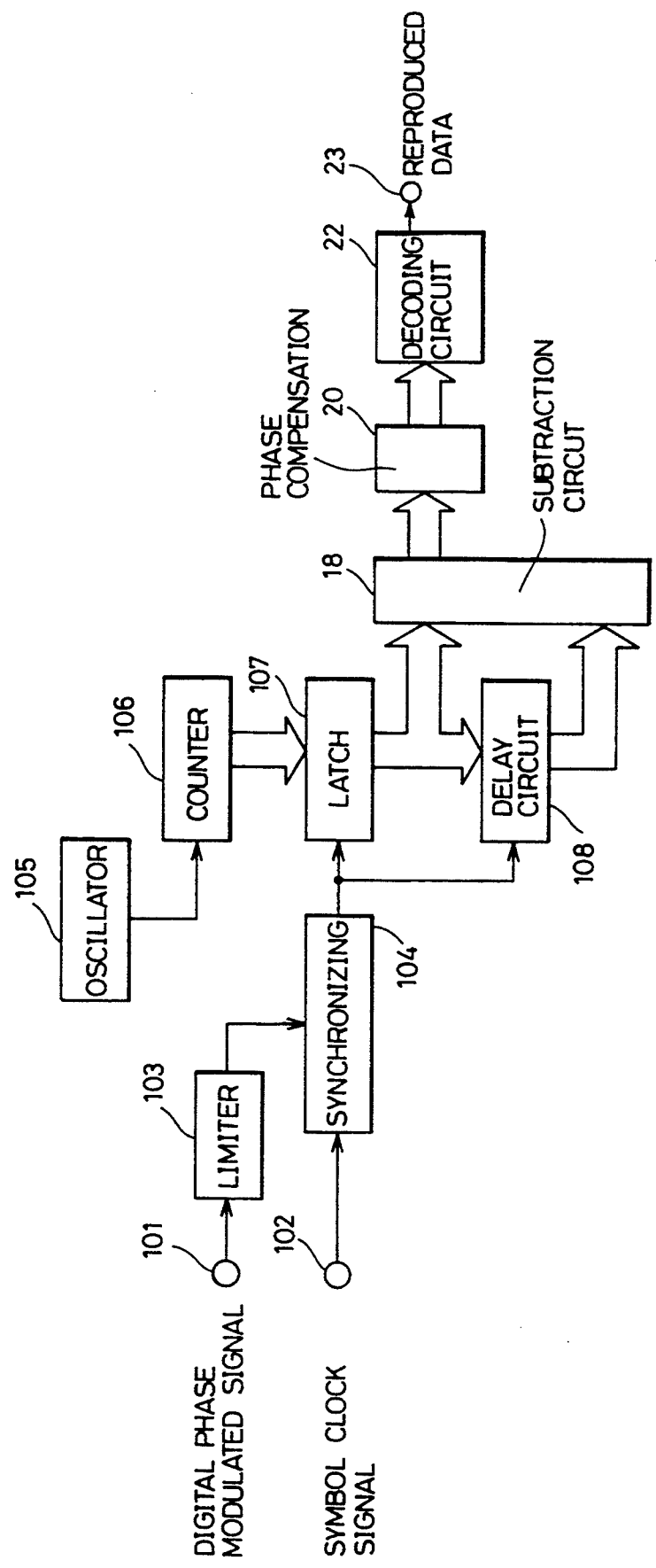
FIG. 18 is a schematic block diagram showing a modification of the first embodiment of the present invention.

FIG. 18 is a block diagram showing a modification in which the phase compensation circuit according to the present invention shown in FIG. 14 is combined with the conventional digital demodulator shown in FIG. 7. Since description has already been given on individual components of the modification shown in FIG. 18 with reference to FIGS. 7 and 8, description thereof will not be repeated.

The principle of compensation of the frequency offset by a digital demodulator of the modification shown in FIG. 18 will now be described. As is clear from FIG. 17, the phase error $\Delta\omega_c T$ which can be compensated is in a range of $4\pi/16$ to $-3\pi/16$. When it is represented as the frequency offset $\Delta f_c$, the following equation (11) is obtained. In the equation, the symbol section T is $T=1/(21\times 10^3)$ second in, for example, the digital cellular telecommunication system standard (RCR STD-27) of Japan.

$$\begin{aligned} \Delta f_c &= \Delta\omega_c/2\pi \\ &= \Delta\omega_c T/(2\pi T) \\ &= \Delta\omega_c T \cdot (21 \times 10^3)/2\pi [\text{Hz}] \end{aligned} \quad (11)$$

From the above-described equation (11), the phase error $\Delta\omega_c T$ and the frequency offset $\Delta f_c$ are in the relation shown in a table of FIG. 19. From the table of FIG. 19, it is understood that compensation of the frequency offset can be carried out if the frequency offset $\Delta f_c$ is in a range of 2625 to $-1968.75$ Hz. For example, as in the embodiment of the present invention, when the carrier frequency of the input digital phase modulated signal is 450 kHz, it is possible to carry out accurate decoding operation because of the above-described frequency offset compensation, even if the frequency offset $\Delta f_c$ causes the carrier frequency to be a value in a range of 452.625 to 448.03125 kHz. As a result, it is possible to carry out decoding operation which is not inferior to the case where there is no phase error.

Returning to the first embodiment shown in FIG. 8, the phase change data to which the above-described phase compensation has been applied by phase compensation circuit 20 is given to decoding circuit 22. Decoding circuit 22 decodes the phase change of four values of $3\pi/4$, $\pi/4$, $-90/4$, $-3\pi/4$ according to the table of FIG. 6 to obtain 2-bit symbol data. Decoding circuit 22 (see FIG. 8) further serial/parallel converts the symbol data into received serial data, and provides the same to output terminal 23.

Figure 20:
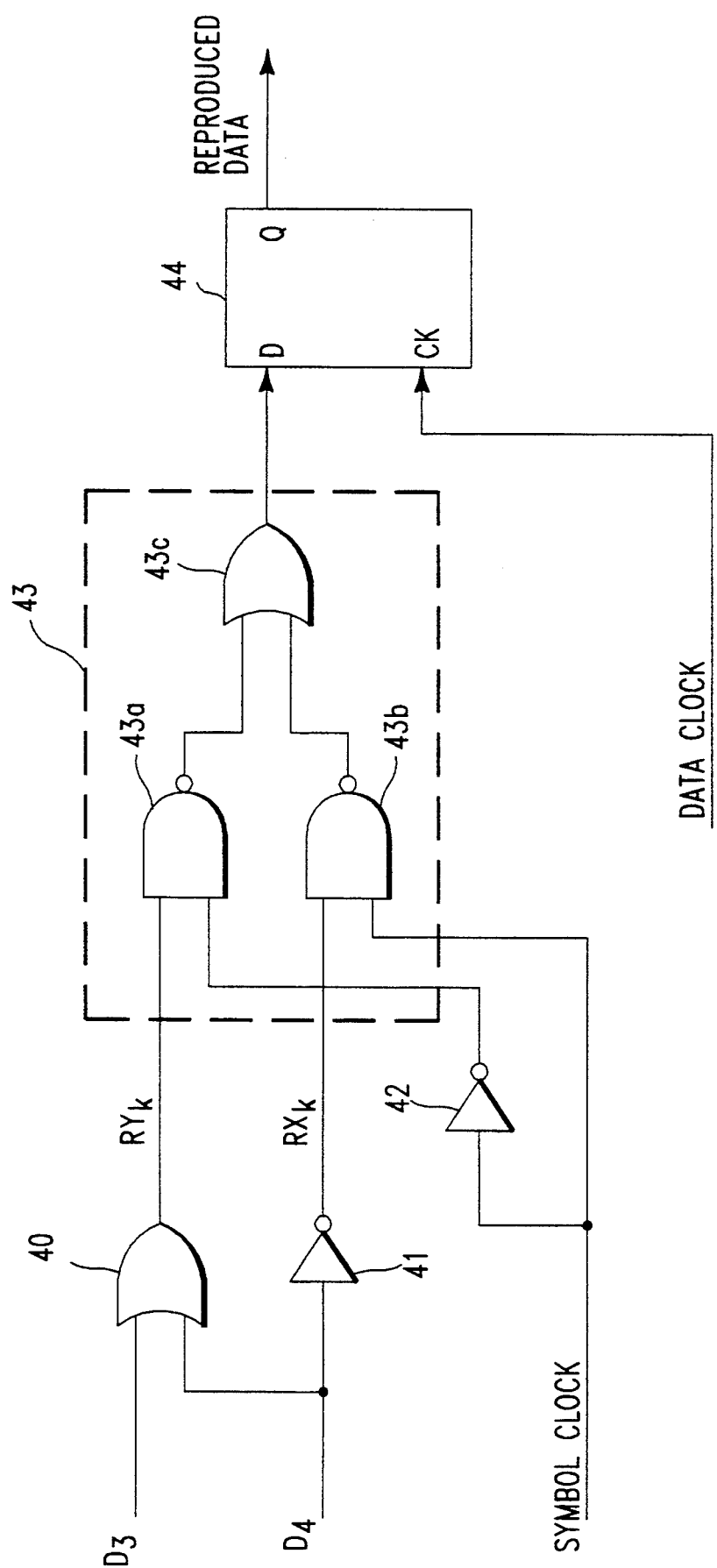
FIG. 20 is a block diagram showing an example of a circuit configuration of a decoding circuit of the first embodiment shown in FIG. 8.
Figures 21, 22:
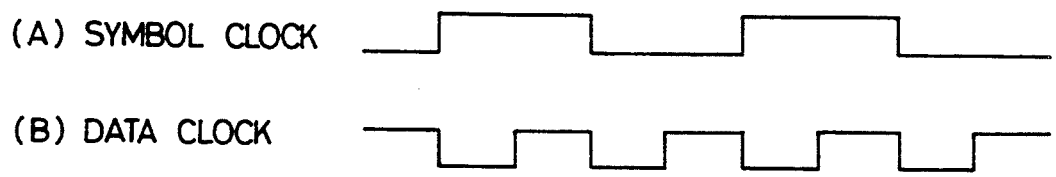
FIG. 21 is a timing chart showing the relation between a symbol clock signal and a data clock signal in each embodiment of the present invention.
FIG. 22 is a table for explaining a decoding operation of the decoding circuit shown in FIG. 20.

FIG. 20 is a block diagram showing one example of a circuit configuration of such decoding circuit 22. Out of 5-bit phase change data $D_0$ to $D_4$ (the second column of FIG. 17) to be applied from phase compensation circuit 20 to decoding circuit 22, decoding operations are performed in response to the higher two bits $D_3$ and $D_4$ based on a table of FIG. 22 corresponding to the table of FIG. 6. More specifically, an exclusive OR gate 40 receives the data bits $D_3$ and $D_4$ to provide $RY_k$ corresponding to $Y_k$ of FIG. 6. An inverter 41 receives the data bit $D_4$ to provide $RX_k$ corresponding to $X_k$ of FIG. 6. By a selector 43 constituted of AND gates 43a and 43b, opened and closed in a complementary manner by the symbol clock signal shown in waveform (A) in FIG. 21, and an OR gate 43c, parallel 2-bit data $RX_k$, $RY_k$ are converted into serial data. The converted serial data is applied to the data input of a flip-flop 44 clocked by the data clock signal shown in waveform (B) in FIG. 21. The serial data $X_k$, $Y_k$ having their waveforms shaped by the flip-flop is eventually provided as reproduced data.

As described above, according to the first embodiment of the present invention, synchronization of the input digital phase modulated signal is not carried out based on the symbol clock signal as in the conventional example of FIG. 7. Therefore, it is not necessary to separately generate a symbol clock signal by using a complicated analog circuit, thereby making it possible to implement the entire digital demodulator as an LSI circuit.

According to the second embodiment of the present invention, phase compensation is applied to the detected phase change data in one symbol detection. Therefore, it is possible to eliminate an adverse influence on demodulating operation caused by the frequency offset that occurs between the transmitting side and the receiving side and Doppler phasing in mobile communication.

Figure 23:
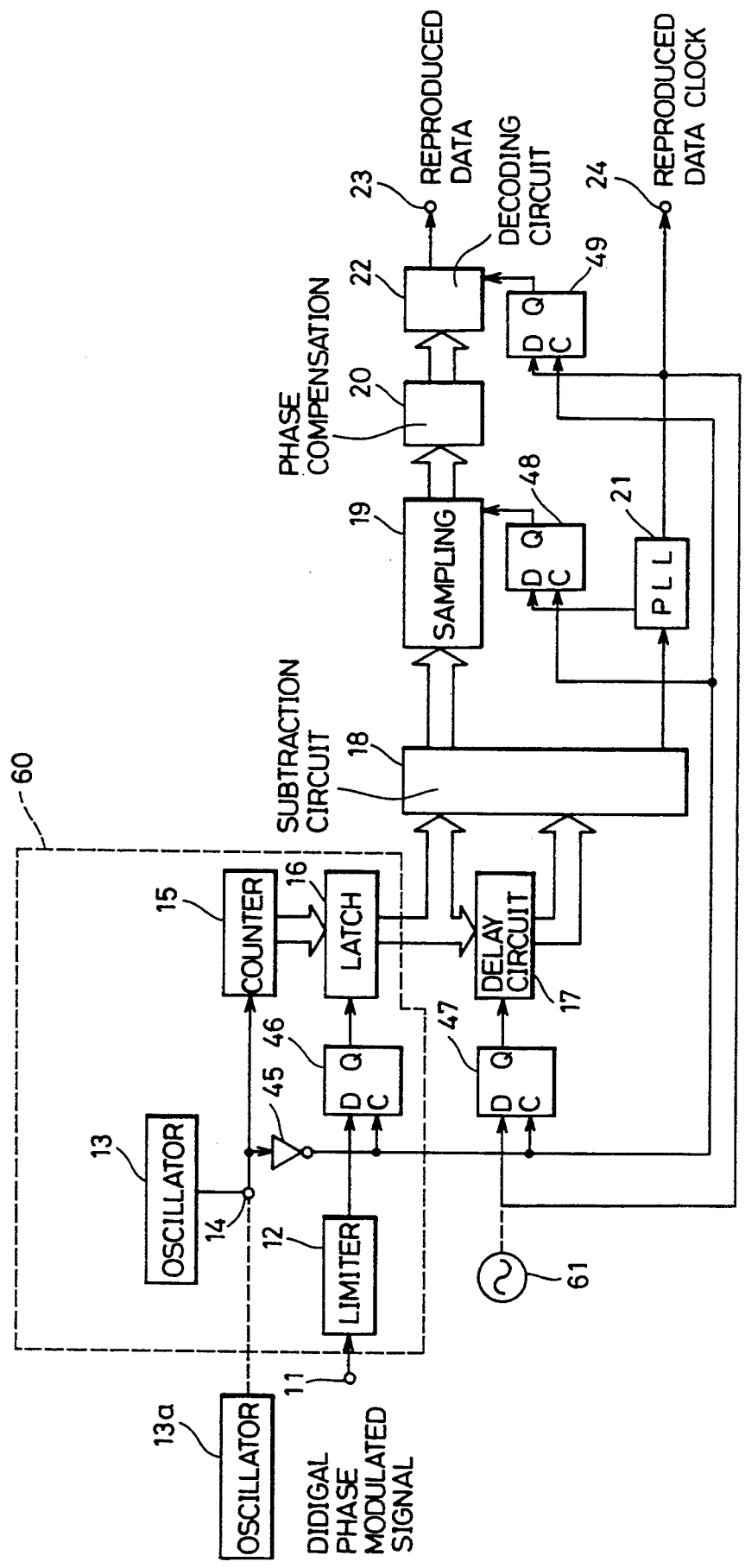
FIG. 23 is a schematic block diagram showing a configuration of a digital demodulator according to a second embodiment of the present invention.

FIG. 23 is a schematic block diagram showing a configuration of a digital demodulator according to the second embodiment of the present invention. Since the second embodiment shown in FIG. 23 is identical to the first embodiment shown in FIG. 8 excluding the following points, description will not be repeated on common portions.

More specifically, the digital demodulator of the second embodiment shown in FIG. 23 includes, in addition to the configuration of the digital demodulator of the first embodiment shown in FIG. 8, an inverter 45 for inverting the output of oscillator 13, a D-type flip-flop 46 for synchronizing the output from limiter 12 to latch circuit 16 with a clock signal supplied from oscillator 13 through inverter 45, a D-type flip-flop 47 for synchronizing a data clock signal from PLL circuit 21 (or separately provided clock signal source 61) to delay circuit 17 with a clock signal supplied from oscillator 13 through inverter 45, a D-type flip-flop 48 for synchronizing a symbol clock signal from PLL circuit 21 to sampling circuit 19 with a clock signal supplied from oscillator 13 through inverter 45, and a D-type flip-flop 49 for synchronizing a data clock signal from PLL circuit 21 to decoding circuit 22 with a clock signal supplied from oscillator 13 through inverter 45.

Figure 24:
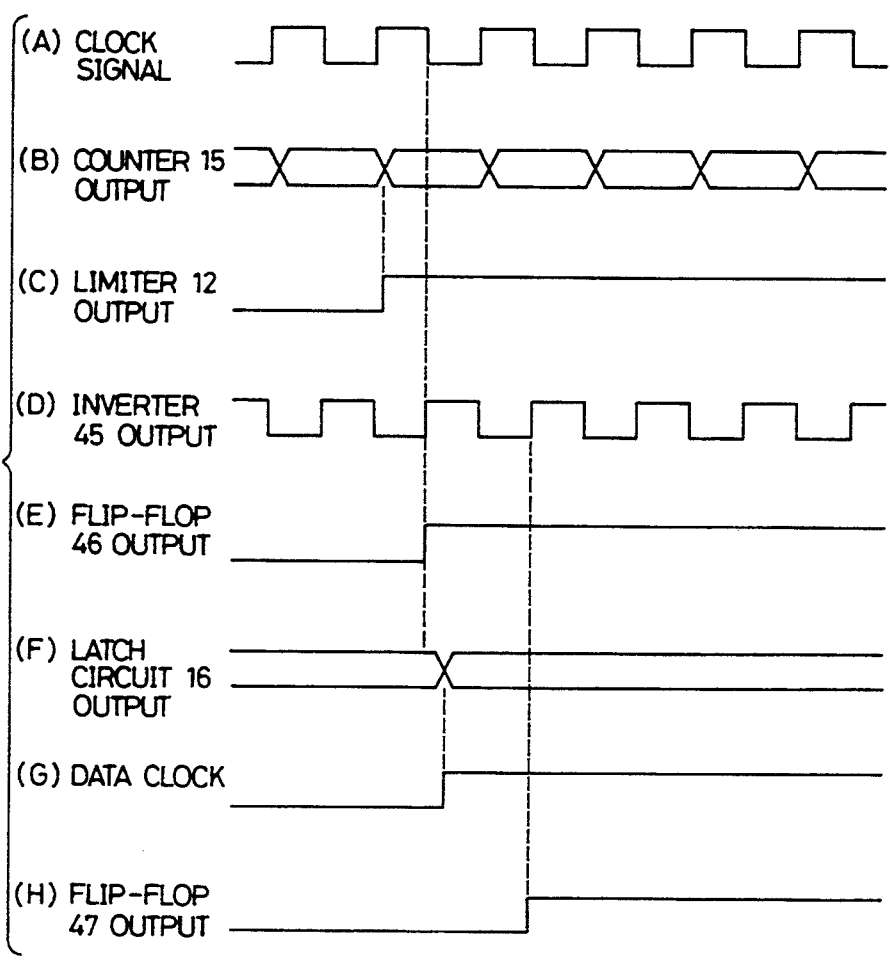
FIGS. 24 and 25 are timing charts for explaining an operation of the second embodiment shown in FIG. 23.
Figure 25:
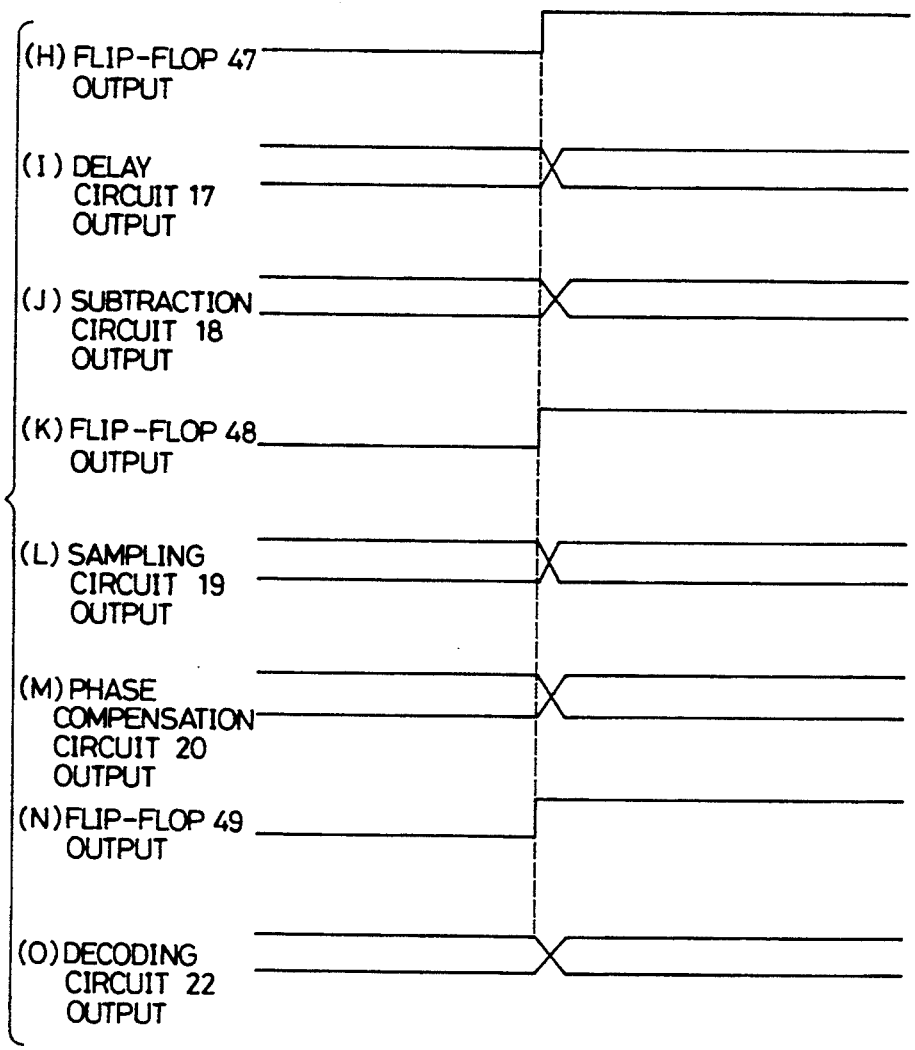

FIGS. 24 and 25 are timing charts for use in explaining operation of the second embodiment. FIGS. 24 and 25 both constitute one timing chart as a whole, with the last waveform (H) of FIG. 24 directly corresponding to the first waveform (H) of FIG. 25. Although latch circuit 16 shown in FIG. 23 latches a count value of counter 15 in response to a rising edge produced in the output of limiter 12 (waveforms (B) and (C) in FIG. 9), basically similar to the case of the first embodiment of FIG. 8, there are some cases where the output of limiter 12 rises when the count output of counter 15 is in an unstable state, as shown by waveforms (B) and (C) in FIG. 24. In the second embodiment of the present invention, a phase of the output of limiter 12 is shifted by D-type flip-flop 46 so that latch circuit 16 carries out its latch operation in the state where the count output of counter 15 is stable.

In order to carry out such operation, the output of limiter 12 (waveform (C) in FIG. 24) is applied to a D terminal of D-type flip-flop 46. A signal (waveform (D) in FIG. 24) obtained by inverting a clock signal (waveform (A) in FIG. 24) provided from oscillator 13 by inverter 45 is applied to a clock (C) terminal of D-type flip-flop 46. A D-type flip-flop generally has a characteristic of holding a signal applied to the D terminal when a rising edge of a signal is applied to its clock terminal. Therefore, as shown in waveform (E) in FIG. 24, a phase of the output (waveform C) of limiter 12 is delayed by D-type flip-flop 46 so that the delayed output coincides with the timing of the falling edge of the clock signal (waveform A).

If latch circuit 16 latches the output (waveform B) in FIG. 24) of counter 15 at a timing of a rising edge of the output (waveform E) of D-type flip-flop 46, as is clear from the figure, a latch operation by latch circuit 16 will be carried out while the output (B) of counter 15 is stable. Therefore, latch circuit 16 can reliably hold and provide a count value of counter 15. As a result, the output data (waveform (F) in FIG. 24) of a latch edge circuit 16 is changed at a timing slightly delayed from a timing of falling of the clock signal (waveform A), causing an unstable state of the output (waveform F) of latch circuit 16 to occur within a half-period later than the timing of falling of the clock signal (waveform A).

As described above, when the instant phase data (that is, the latch circuit output shown in waveform (F) in FIG. 24) as shown in waveform (D) in FIG. 9 is obtained, the data is delayed for one symbol section by delay circuit 17, and the phase data preceding by one symbol section as shown in waveform (E) in FIG. 9 is obtained. There are also some cases where an edge of the data clock signal supplied from PLL circuit 21 rises, as shown in waveform (G) in FIG. 24, when the output (waveform (F) in FIG. 24) of latch circuit 16 is unstable. Therefore, in the second embodiment, a delay operation by delay circuit 17 is carried out in the state where the output (waveform F) of latch circuit 16 is stable by shifting a phase of the data clock signal by D-type flip-flop 47.

More specifically, a data clock signal (waveform (G) in FIG. 24) from PLL circuit 21 (or independent data clock signal source 61) and the output (waveform D) of inverter 45 are applied to the D terminal and the clock terminal of D-type flip-flop 47, respectively. As described above, since the D-type flip-flop has a characteristic of holding a signal applied to the D terminal at a timing of a rising edge of a signal is applied to its clock terminal, a phase of the data clock signal (waveform G) is delayed by D-type flip-flop 47 to correspond to a timing of the succeeding falling edge of the clock signal (waveform A) as shown by waveform (H) in both FIG. 24 and FIG. 25. As a result, the delay operation of delay circuit 17 at an unstable value of the output (waveform F) of latch circuit 16 is avoided.

When the phase data preceding by one symbol section as shown by waveform (I) in FIG. 25 is obtained, subtraction circuit 18 subtracts the phase data provided from delay circuit 17 from the instant phase data held by latch circuit 16 to provide the phase change data as shown by waveform (J) in FIG. 25. At this time, subtraction circuit 18, constituted of a logic circuit, has its output brought into an unstable state both during an unstable period of the output of latch circuit 16 and during an unstable period of the output of delay circuit 17.

Out of such unstable states of the output of subtraction circuit 18, the unstable state caused by instability of the output of latch circuit 16 occurs during a period when a digital phase modulated signal is synchronized to a timing of a falling edge of the output of D-type flip-flop 46, that is, the clock signal (waveform A), as shown in waveforms (E) and (F) in FIG. 24. On the other hand, the unstable state of the output of subtraction circuit 18 caused by instability of the output of delay circuit 17 occurs in a data clock period synchronized to a timing of a falling edge of the output of D-type flip-flop 47, that is, the clock signal (waveform A), as shown in waveforms (H) and (I) in FIG. 25. Therefore, the unstable period of the output of subtraction circuit 18 occurs after a falling edge of the clock signal (waveform A) and before the rising edge thereof, as shown in waveform (J) in FIG. 25.

In the second embodiment, a phase of the 10 symbol clock signal is delayed to a timing of a falling edge of the clock signal (waveform A) by D-type flip-flop 48 so that the symbol clock signal from PLL circuit 21 to sampling circuit 19 will not rise at such a timing. Therefore, the symbol clock signal from PLL circuit 21 and an inverted clock signal (waveform D) from inverter 45 are applied to the D terminal and the clock terminal of D-type flip-flop 48, respectively. As a result, as shown in waveform (K) in FIG. 25, the output of D-type flip-flop 48 rises at a timing during a period excluding the unstable period of the output (waveform J) of subtraction circuit 18, and sampling circuit 19 samples the output of subtraction circuit 18 at such timing to provide the same as shown by waveform (L) in FIG. 25.

Furthermore, as shown in waveform (l) in FIG. 25, the unstable state of the output of sampling circuit 19 occurs in a period immediately after sampling, that is, immediately after a falling edge of the clock signal (waveform A). The sampling output and the output obtained by applying phase compensation to the sampling output are brought into respective stable states before the next successive rising edge in the clock signal. In this second embodiment, a phase of the data clock signal from PLL circuit 21 to decoding circuit 22 is shifted by D-type flip-flop 49 so that decoding circuit 22 will not perform a decoding operation during the unstable period of the output (waveform (M) in FIG. 25) to which phase compensation has been applied. Therefore, the data clock signal from PLL circuit 21 and the inverted clock signal (waveform D) from inverter 45 are applied to the D terminal and the clock terminal of D-type flip-flop 49, respectively. As a result, as shown by waveform (N) in FIG. 25, the output of D-type flip-flop 49 rises at a timing during a period excluding the unstable period of the output (waveform L) of sampling circuit 19, and decoding circuit 22 decodes the output of phase compensation circuit 20 at that timing to provide the decoded output (waveform (O) in FIG. 25).

Figure 26:
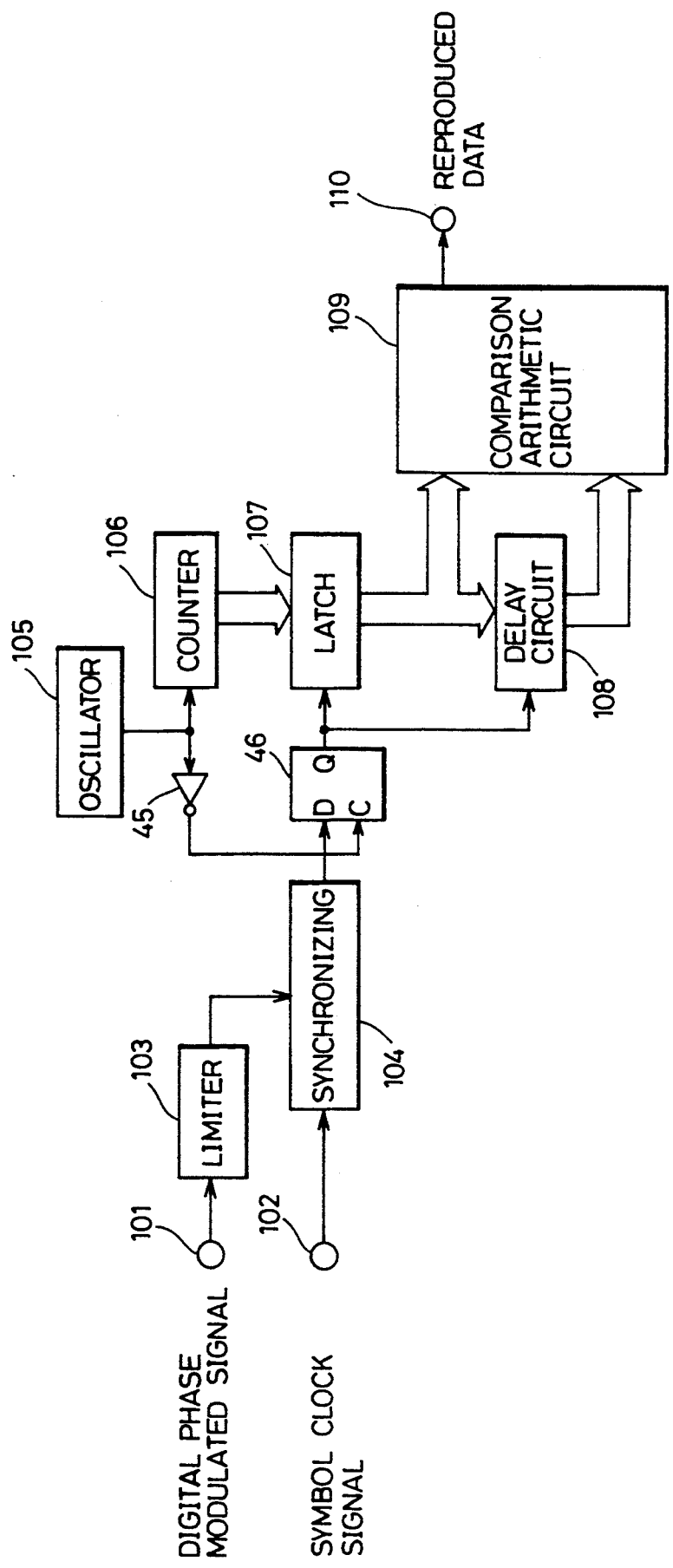
FIG. 26 is a schematic block diagram showing a modification of the second embodiment shown in FIG. 23.

In the above-described second embodiment, the present invention is applied to a digital demodulator of a type that internally generates a symbol clock signal within PLL circuit 21. However, the present invention can be applied to a digital demodulator of a type of a conventional example of FIG. 7 which uses an externally generated symbol clock formed. FIG. 26 shows a modification in which the present invention is applied to the conventional digital demodulator. Since description was previously given for operations of individual components with reference to FIGS. 7 and 23, that description will not be repeated.

As described with respect to FIG. 23 and, according to the second embodiment of the present invention, each of latch circuit 16, delay circuit 17, sampling circuit 19 and decoding circuit 22 has its operational timing controlled in response to a reference clock signal provided from oscillator 13 so as not to operate in the unstable state of its input, whereby accurate operation of each circuit, and thus accurate data decoding are ensured.

Figure 27:
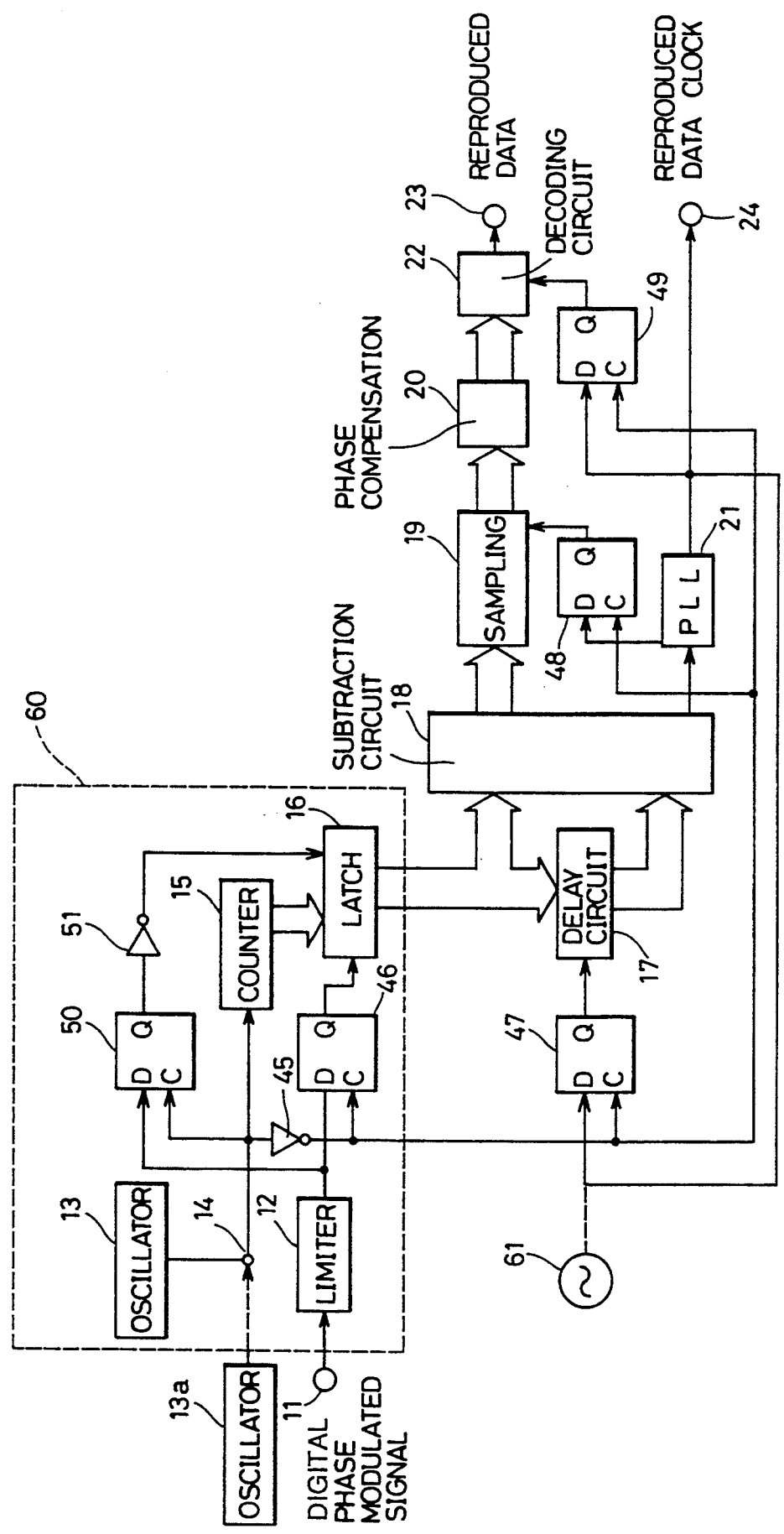
FIG. 27 is a schematic block diagram showing a configuration of a digital demodulator according to a third embodiment of the present invention.

FIG. 27 is a schematic block diagram showing a configuration of a digital demodulator according to the third embodiment of the present invention. Since the third embodiment shown in FIG. 27 is identical to the second embodiment shown in FIG. 23 with exception of the following points, description will not be repeated on the common parts.

More specifically, the digital demodulator of the third embodiment shown in FIG. 27 includes, in addition to the configuration of the digital demodulator shown in FIG. 23, a D-type flip-flop 50 for supplying the output of limiter 12 in synchronism with a clock signal supplied from oscillator 13, and an inverter 51 for inverting the output of D-type flip-flop 50 and for applying a resulting inverted output to another input of latch circuit 16.

Figure 28:
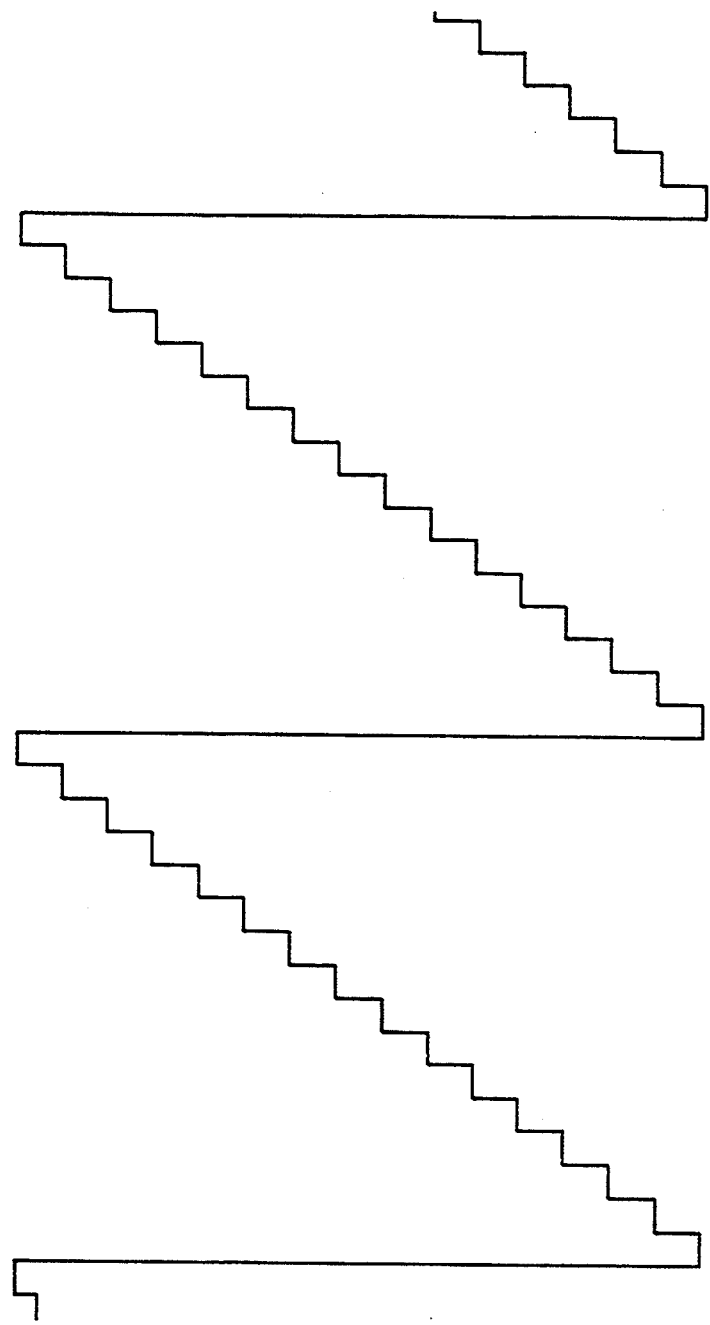
FIG. 28 is a diagram showing an enlarged waveform of phase information in the third embodiment of the present invention.

In the above-described first and second embodiments, the oscillation frequency of oscillator 13 is set to 14.4 MHz, 32 times the carrier frequency 450 kHz of the digital phase modulated signal. However, in the third embodiment, it is set to 7.2 MHz, 16 times the carrier frequency. As a result, when a duty ratio of the clock signal is 50%, counter 15 1/16 frequency-divides the clock signal of 450 kHz provided from oscillator 13 to provide a 4-bit parallel count value. FIG. 28 is a diagram showing an enlarged waveform of the count output (first phase information) of counter 15 in this case.

Figure 29:
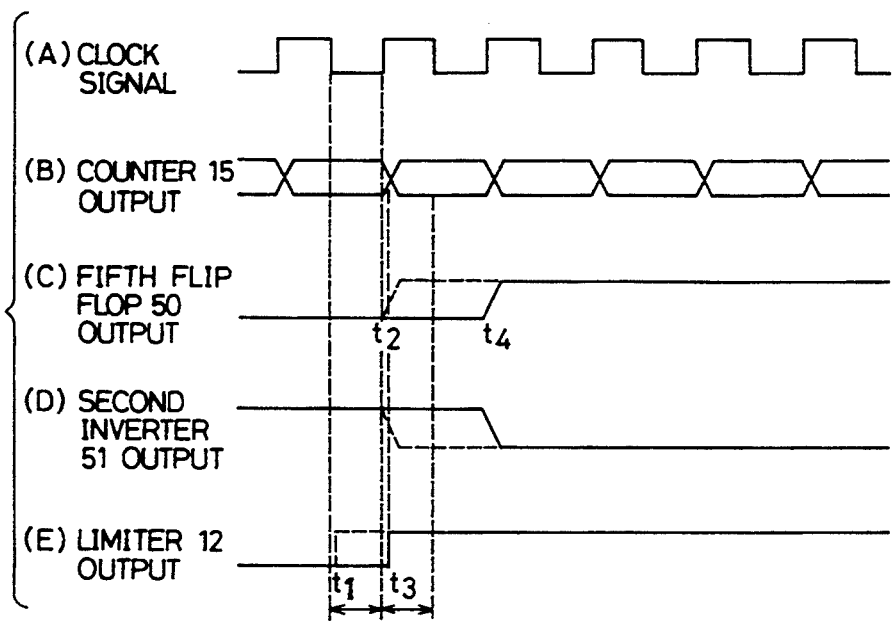
FIG. 29 is a timing chart for explaining the operation of the third embodiment shown in FIG. 28.

FIG. 29 is a timing chart for explaining the operation of the third embodiment of the present invention. When the reference clock frequency of oscillator 13 is set higher than the carrier frequency of the digital phase modulated signal as in the above-described first and second embodiments, power consumption unfortunately increases. However, in the third embodiment, since the reference clock frequency is set lower as described above, it is possible to suppress an increase of power consumption that would otherwise occur for a higher clock frequency. However, when the reference clock frequency is set low, a sufficient resolution required for accurate decoding can not be obtained. Therefore, in the third embodiment, by utilizing second phase information, which will be described later, in addition to the first phase information provided from counter 15, phase resolution should be enhanced and power consumption is suppressed.

As shown by a broken line in waveform (E) in FIG. 29, when the output of limiter 12 rises at a time $t_1$ when the clock signal (waveform (A) in FIG. 29) provided from oscillator 13 is at an "L" level, the output of D-type flip-flop 50 driven by the clock signal (waveform A) rises to an "H" level as shown by a broken line at a timing shown by $t_2$ of waveform (C) in FIG. 29. Accordingly, the output of inverter 51 falls to an "L" level as shown by a broken line of waveform (D) in FIG. 29.

Conversely, as shown by a solid line in waveform (E) in FIG. 29, when the output of limiter 12 rises at a time $t_3$ when the clock signal (waveform A) provided from oscillator 13 is at an "H" level, the output of D-type flip-flop 50 driven by the clock signal (waveform A) rises to an "H" level as shown by a solid line at a timing shown by $t_4$ of waveform (C) in FIG. 29. Accordingly, the output of inverter 51 falls to an "L" level as shown by a solid line of waveform (D) in FIG. 29.

More specifically, inverter 51 provides the output of an "L" level if the output of limiter 12 rises during the first half of one period of the clock signal (waveform A), and provides the output of an "H" level if the output of limiter 12 rises during the second half of one period of the clock signal (waveform A). Therefore, based on the output level of inverter 51, it is possible to determine whether the timing of a rising edge of the output of limiter 12 occurs during the first half or the second half of one period of the clock signal (waveform A). Therefore, it is possible to use the output of inverter 51 as second phase information of one bit which is finer than the first phase information provided from counter 15.

More specifically, the first phase information of four bits provided from counter 15 is applied to latch circuit 16 as the high order four bits. The second phase information of one bit provided from inverter 51 is applied to latch circuit 16 as the least significant bit. As a result, latch circuit 16 holds phase information of five bits, similar to the case of the above-described first and second embodiments.

As described above, the 5-bit phase information makes it possible to divide one period of the clock signal (A) into 32, whereby it is possible to implement a resolution of $2\pi/32$ as shown in FIG. 10. As already described in conjunction with the second embodiment of FIG. 23, latch circuit 16 latches the 5-bit phase information in response to a rising edge of the output of D-type flip-flop 46 in order to provide the same as the instant phase data. Operations thereafter are identical to those of the second embodiment of FIG. 23.

In the above-described third embodiment, the present invention is applied to a digital demodulator of a type that generates a symbol clock signal internally within PLL circuit 21. However, it is possible to apply the present invention to a digital demodulator of a conventional example of FIG. 7 which uses an externally generated symbol clock. FIG. 30 shows a modification in which the present invention is applied to a digital demodulator of a conventional example. Since description has been already given on operations of individual components with reference to FIGS. 7 and 27, the description will not be repeated.

As described above, in the third embodiment of the present invention, it is possible to suppress an increase in power consumption since a reference clock signal of a frequency of ½ of the frequency of the reference clock signal of the above-described first and second embodiments is used. At the same time, it is possible to obtain phase resolution similar to that of the first and second embodiments by obtaining 5-bit phase information equivalent to that used in the first and second embodiments.

In each of the above-described embodiments, description was given to the case where the present invention is applied to a $\pi/4$ shift QPSK modulating system. However, the present invention can be applied to the other digital phase modulating systems. In place of limiter 12 used in each embodiment, a zero crossing detector may be used which detects a zero crossing point of the input digital phase modulated signal and, in turn, supplies an output at an "H" level or an "L" level. Furthermore, it is needless to say that each embodiment can be implemented in a software manner by using a microcomputer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital demodulator comprising:
   an input terminal to which a digital phase modulated analog signal is applied, said digital phase modulated analog signal containing symbol data that occurs at a given symbol period;
   means for converting said digital phase modulated analog signal into a phase modulated digital signal, said phase modulated digital signal possessing a digitized amplitude wherein said digitized amplitude is a logic level that corresponds to an amplitude value of said digital phase modulated analog signal;
   a first clock signal source for supplying a reference clock signal having a constant reference frequency;
   means for counting said reference clock signal in order to generate a counted value;
   means, responsive to said phase modulated digital signal, for storing the counted value, at the occurrence of one of a plurality of pre-defined periodically occurring points in said phase modulated digital signal, so as to form a stored value;
   means for delaying the stored value for the given symbol period so as to form a delayed value;
   means for subtracting the delayed value from the stored value in order to provide phase change data;
   a second clock signal source, responsive to said phase change data, for generating a symbol clock signal, wherein said symbol clock signal has a symbol period defined by said phase change data;
   means for sampling the phase change data in response to the symbol clock signal in order to generate sampled phase change data; and
   means for decoding the sampled phase change data in order to reproduce the symbol data.

2. The digital demodulator as recited in claim 1 wherein said second clock signal source comprises phase locked loop (PLL) means for generating the symbol clock signal wherein the symbol clock signal is synchronized to an average timing of sign inversions of the phase change data.

3. The digital demodulator as recited in claim 2 wherein said PLL means comprises means for generating a data clock signal, wherein the data clock signal is synchronized to and has a frequency that is a frequency multiple of the symbol clock signal.

4. The digital demodulator as recited in claim 3 wherein said delay means is connected to the data clock signal generated by said PLL means, wherein the data clock signal defines a delay interval produced by the delay means.

5. The digital demodulator as recited in claim 1 further comprising:
   a third clock signal source for supplying a data clock signal, wherein said data clock signal has a frequency that is a frequency multiple of said symbol clock; and
   said delay means is connected to the data clock signal, wherein the data clock signal defines a delay interval produced by the delay means.

6. The digital demodulator as recited in claim 2 wherein said PLL means is responsive to both said phase change data and the reference clock signal for generating the symbol clock signal.

7. The digital demodulator as recited in claim 6 wherein said PLL means comprises:
   means for comparing said phase change data with the symbol clock signal in order to determine a phase difference therebetween and for producing a first pulse if the phase change data leads the symbol clock signal and a second pulse if the symbol clock signal leads the phase change data;
   a reversible counter, operative in response to said first and second pulses and storing a counted phase difference value therein, for incrementing or decrementing the counted phase difference value in response to the first or second pulses therein, respectively, and for producing first and second control signals whenever the counted phase difference value reaches a first or second pre-defined limit value, respectively, and for resetting the counted phase difference value to a pre-defined initial value immediately after the counted phase difference value reaches either of the first or second limit values;
   phase control means, operative in response to said first and second control signals and to said reference clock signal, for producing an intermediate clock signal such that as a result of the occurrence of the first or second control signals the intermediate clock signal respectively contains an increased or decreased number of clock pulses per unit time over a number of pulses per unit time then occurring in said symbol clock signal;
   frequency-dividing means for dividing the intermediate clock signal, in frequency, in order to form the symbol clock signal.

8. A digital demodulator comprising:
   an input terminal to which a digital phase modulated analog signal is applied, said digital phase modulated analog signal containing symbol data that occurs at a given symbol period;
   means, responsive to a reference clock signal, for determining a phase difference of the digital phase modulated analog signal with respect to the reference clock signal and for providing a digital phase value representative of the phase difference;
   means for delaying the digital phase value for the given symbol period so as to form a delayed value;
   first means for subtracting the delayed value from the digital phase value in order to provide phase change data;
   phase compensation means for detecting phase error within the phase change data and for generating compensated phase change data, the compensated phase change data being formed of the phase change data but from which the phase error has been removed; and
   means for decoding the compensated phase change data in order to reproduce the symbol data.

9. The digital demodulator as recited in claim 8 wherein the phase compensation means comprises:
   means for detecting residual phase error within the compensated phase change data;

means, responsive to the detecting means, for averaging the detected residual phase error over a plurality of symbol periods;

a first reversible counter, having a first value stored therein, for selectively incrementing or decrementing the first value in response to an output of the averaging means so as to provide a count value;

second subtracting means for subtracting the count value from the phase change data so as to form the compensated phase change data; and wherein the residual phase error detecting means, the averaging means, the first reversible counter and the second subtracting means form a feedback loop.

10. The digital demodulator as recited in claim 9 wherein said averaging means comprises:

a second reversible counter, having a second value stored therein and operative in response to the residual phase error detecting means, for selectively incrementing or decrementing the second value; and means for resetting the second value to an initial value immediately after the second value attains a pre-defined limit value.

11. The digital demodulator as recited in claim 9 wherein the phase difference determining means comprises:

means for converting said digital phase modulated analog signal into a phase modulated digital signal, said phase modulated digital signal possessing a digitized amplitude wherein said digitized amplitude is a logic level that corresponds to an amplitude value of said digital phase modulated analog signal;

a first clock signal source for supplying the reference clock signal having a constant reference frequency;

means for counting said reference clock signal in order to generate a counted value;

means, responsive to said phase modulated digital signal, for storing the counted value, at the occurrence of one of a plurality of pre-defined periodically occurring points in said phase modulated digital signal, so as to form a stored value; and wherein the digital demodulator further comprises:

a second clock signal source, responsive to said phase change data, for generating a symbol clock signal, wherein said symbol clock signal has a symbol period defined by said phase change data; and means for sampling the phase change data in response to the symbol clock signal in order to generate sampled phase change data and for supplying said sampled phase change data as said phase change data to the phase compensation means.

12. The digital demodulator as recited in claim 11 wherein said second clock signal source comprises phase locked loop (PLL) means for generating the symbol clock signal wherein the symbol clock signal is synchronized to an average timing of sign inversions of the phase change data.

13. The digital demodulator as recited in claim 12 wherein said PLL means comprises means for generating a data clock signal, wherein the data clock signal is synchronized to and has a frequency that is a frequency multiple of the symbol clock signal.

14. The digital demodulator as recited in claim 13 wherein said delay means is connected to the data clock signal generated by said PLL means, wherein the data clock signal defines a delay interval produced by the delay means.

15. The digital demodulator as recited in claim 11 further comprising:

a third clock signal source for supplying a data clock signal, wherein said data clock signal has a frequency that is a frequency multiple of said symbol clock; and said delay means is connected to the data clock signal, wherein the data clock signal defines a delay interval produced by the delay means.

16. The digital demodulator as recited in claim 12 wherein said PLL means is responsive to both said phase change data and the reference clock signal for generating the symbol clock signal.

17. In a digital demodulator for reproducing symbol data occurring at given symbol periods and contained within a phase modulated signal, a phase compensation circuit for detecting phase error within phase change data and removing the phase error therefrom so as to form compensated phase change data, said circuit comprising:

means for detecting residual phase error within the compensated phase change data;

means, responsive to the detecting means, for averaging the detected residual phase error over a plurality of symbol periods;

a first reversible counter, having a first value stored therein, for selectively incrementing or decrementing the first value in response to an output of the averaging means so as to provide a count value;

means for subtracting the count value from the phase change data so as to form the compensated phase change data; and wherein the residual phase error detecting means, the averaging means, the first reversible counter and the subtracting means form a feedback loop.

18. The phase compensation circuit as recited in claim 17 wherein said averaging means comprises:

a second reversible counter, having a second value stored therein and operative in response to the residual phase error detecting means, for selectively incrementing or decrementing the second value; and means for resetting the second value to an initial value immediately after the second value attains a pre-defined limit value.

19. A digital demodulator comprising:

an input terminal to which a digital phase modulated analog signal is applied, said digital phase modulated analog signal containing symbol data that occurs at a given symbol period;

means for converting said digital phase modulated analog signal into a phase modulated digital signal, said phase modulated digital signal possessing a digitized amplitude wherein said digitized amplitude is a logic level that corresponds to an amplitude value of said digital phase modulated analog signal;

a first clock signal source for supplying a reference clock signal having a constant reference frequency;

means for counting said reference clock signal in order to generate a counted value;

first means for synchronizing the phase modulated digital signal with said reference clock signal in order to form a first synchronized signal;

means, responsive to said first synchronized signal, for storing the counted value, at the occurrence of one of a plurality of pre-defined periodically occurring points in said first synchronized signal, so as to form a stored value;

means for delaying the stored value for the given symbol period so as to form a delayed value;

means for subtracting the delayed value from the stored value in order to provide phase change data; and means for decoding the phase change data in order to reproduce the symbol data.

20. The digital demodulator as recited in claim 19 wherein the delay means is controlled, in response to the first synchronized signal, to delay the stored value by said given symbol period, and wherein the first synchronizing means applies the first synchronized signal to the delay means.

21. The digital demodulator as recited in claim 19 further comprising:

a second clock signal source, responsive to said phase change data, for generating a symbol clock signal and a data clock signal, wherein the symbol clock signal has a symbol period defined by the phase change data and the data clock signal is synchronized to and has a frequency that is a frequency multiple of the symbol clock signal.

22. The digital demodulator as recited in claim 21 wherein the delay means is controlled, in response to a second synchronized signal, to delay the stored value by said given symbol period; and said digital demodulator further comprises:

second means for synchronizing the data clock signal with said reference clock signal in order to produce the second synchronized signal and for applying the second synchronized signal to the delay means.

23. The digital demodulator as recited in claim 21 further comprising:

means for sampling the phase change data in response to a third synchronized signal so as to yield sampled phase change data and for applying said sampled phase change data, as the phase change data, to the decoding means; and third means for synchronizing the symbol clock signal with said reference clock signal in order to produce the third synchronized signal and for applying the third synchronized signal to the sampling means.

24. The digital demodulator as recited in claim 21 wherein said decoding means decodes the phase change data in response to a fourth synchronized signal; and said digital demodulator further comprises:

fourth means for synchronizing the data clock signal with said reference clock signal in order to produce the fourth synchronized signal and for applying the fourth synchronized signal to the decoding means.

25. A digital demodulator comprising:

an input terminal to which a digital phase modulated analog signal is applied, said digital phase modulated analog signal containing symbol data that occurs at a given symbol period;

means for converting said digital phase modulated analog signal into a phase modulated digital signal, said phase modulated digital signal possessing a digitized amplitude wherein said digitized amplitude is a logic level that corresponds to an amplitude value of said digital phase modulated analog signal;

a first clock signal source for supplying a reference clock signal having a constant reference frequency;

means for counting said reference clock signal in order to generate a count value as first phase information;

means for holding a value of the phase modulated digital signal for one period of the reference clock signal at an occurrence of a rising or falling edge in said reference clock signal and for supplying the value of the phase modulated digital signal so held as second phase information;

means for storing the first and second phase information in parallel and for supplying, at an occurrence of one of a plurality of pre-defined periodically occurring points in said phase modulated digital signal, a parallel value, that contains both the first and second phase information, as a stored value;

means for delaying the stored value for the given symbol period so as to produce a delayed value;

means for subtracting the delayed value from the stored value in order to provide phase change data; and means for decoding the phase change data to reproduce the symbol data.

26. The digital demodulator as recited in claim 25 wherein the storing means stores the first and second phase information as higher and lower order bits, respectively, within the stored value.

27. The digital demodulator as recited in claim 25 further comprising:

means for synchronizing the phase modulated digital signal with said reference clock signal in order to form a synchronized signal and for applying the synchronized signal to the storing means in order to control when the storing means stores new values of the first and second phase information.

* * * * *